US012105995B2

(12) United States Patent
Kaneda

(10) Patent No.: US 12,105,995 B2
(45) Date of Patent: Oct. 1, 2024

(54) PRINTING APPARATUS AND METHOD FOR CONTROLLING THE SAME FOR NOTIFYING OF OCCURRENCE OF AN ERROR

(71) Applicant: CANON KABUSHIKI KAISHA, Tokyo (JP)

(72) Inventor: Takeshi Kaneda, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/848,187

(22) Filed: Jun. 23, 2022

(65) Prior Publication Data

US 2022/0317940 A1 Oct. 6, 2022

Related U.S. Application Data

(63) Continuation of application No. 17/013,338, filed on Sep. 4, 2020, now Pat. No. 11,403,050.

(30) Foreign Application Priority Data

Sep. 13, 2019 (JP) .................................. 2019-166872

(51) Int. Cl.
G06F 3/12 (2006.01)

(52) U.S. Cl.
CPC ............ G06F 3/121 (2013.01); G06F 3/1234 (2013.01)

(58) Field of Classification Search
CPC ...... G06F 3/121; G06F 3/1234; G06F 3/1248; G06F 11/07

USPC .............................................. 358/1.15, 1.14
See application file for complete search history.

(56) References Cited

U.S. PATENT DOCUMENTS

| 2010/0118337 A1* | 5/2010 | Kiuchi .................. G06F 3/1204 358/1.15 |
| 2012/0224211 A1* | 9/2012 | Ferlitsch ............... G06F 3/1247 358/1.14 |
| 2016/0231970 A1* | 8/2016 | Tabuki .................. G06F 3/1287 |

FOREIGN PATENT DOCUMENTS

JP 2020138391 A 9/2020

\* cited by examiner

Primary Examiner — Jamares Q Washington
(74) Attorney, Agent, or Firm — Canon U.S.A., Inc. IP Division

(57) ABSTRACT

There is provided a printing apparatus that performs printing based on print data received from an information processing apparatus transmitting print data to the printing apparatus, transmitting print data as a substitute for the print data based on first error information, and not transmitting the print data as a substitute for the print data upon receipt of second error information. The printing apparatus includes a detection unit configured to detect that the print data includes data that cannot be processed by the printing apparatus, a determination unit configured to determine error information to be transmitted to the information processing apparatus as the first or second error information based on information included in the print data having been detected to include the data that cannot be processed by the printing apparatus, and a transmission unit configured to transmit the error information determined by the determination unit to the information processing apparatus.

13 Claims, 17 Drawing Sheets

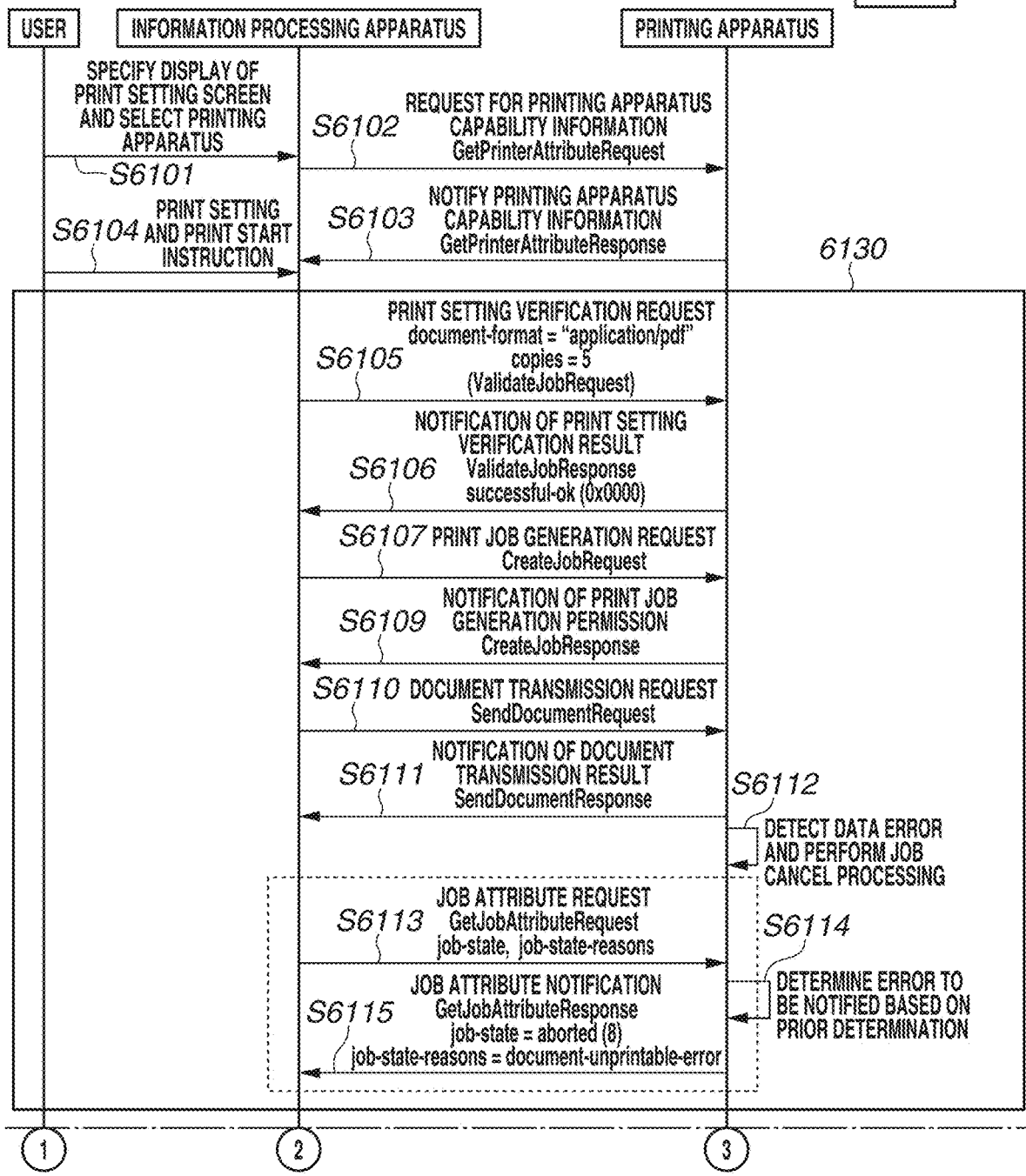
FIG.6A1

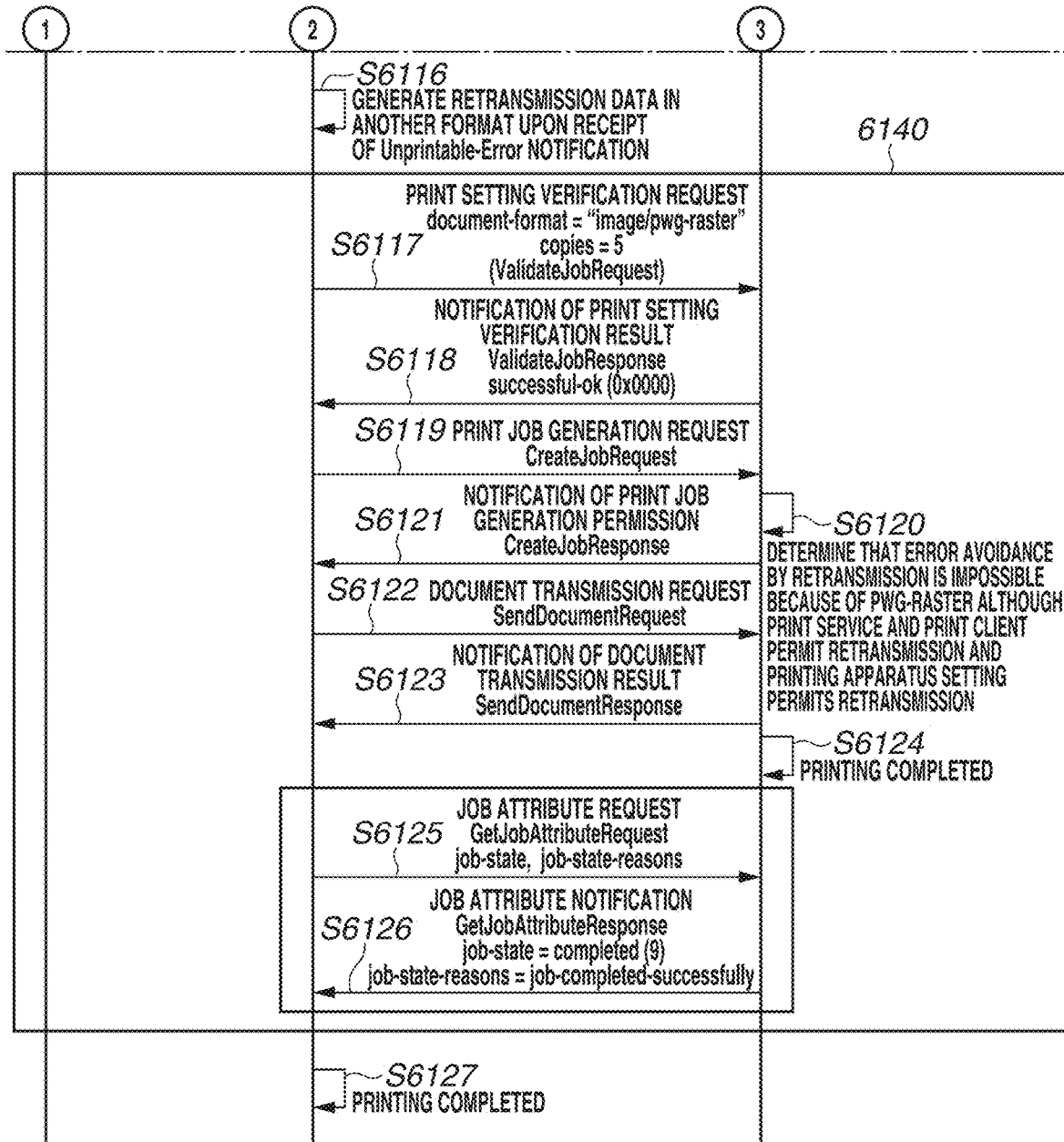

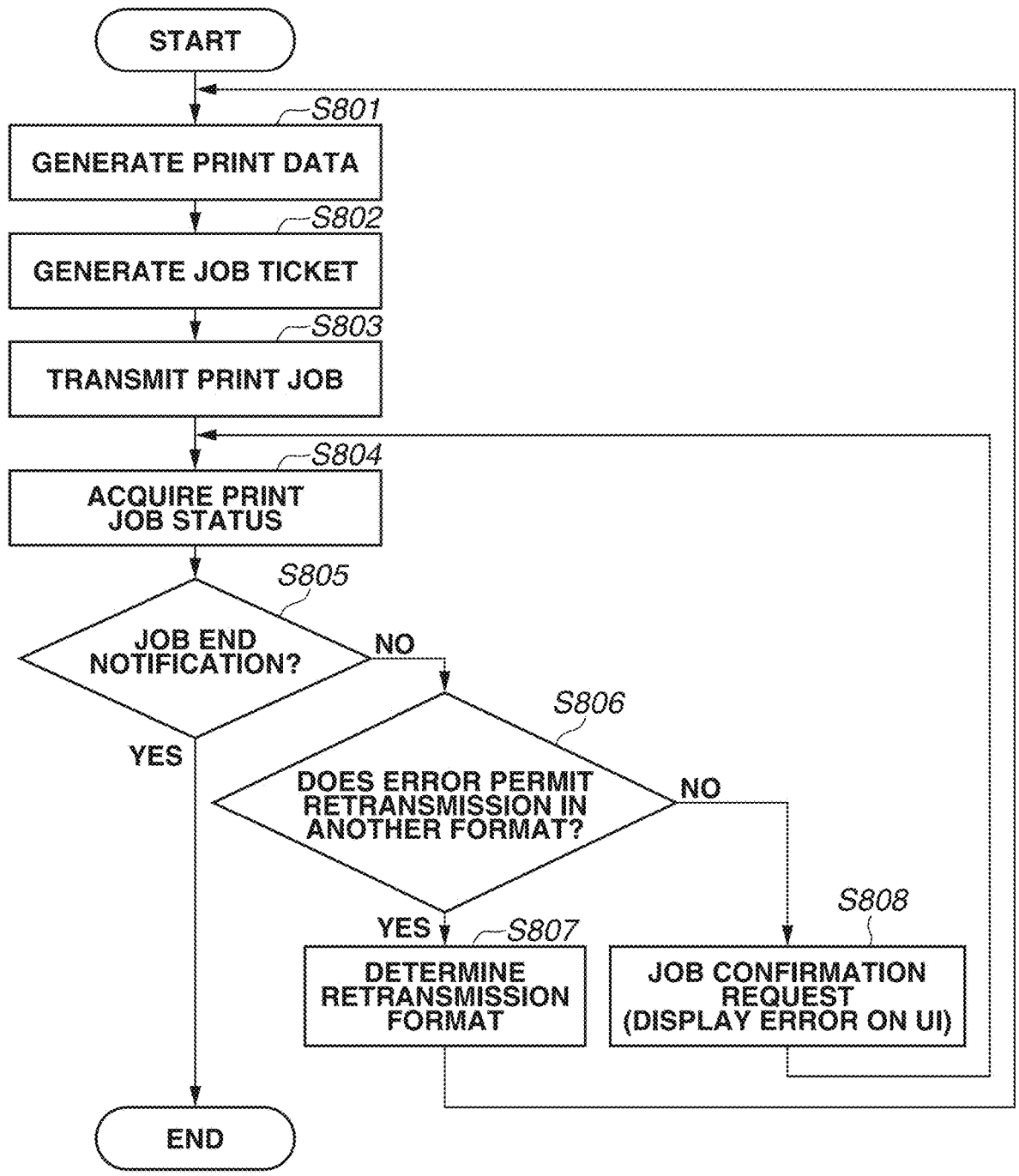

FIG.11

TABLE FOR MANAGING RETRANSMISSION
PERMISSION/INHIBITION FOR EACH PRINT SERVICE 1110

| ServiceID 1111 | ServiceType 1112 | ServiceURL 1113 | ServicePort 1114 | RETRANSMISSION SW 1115 |
|---|---|---|---|---|
| 1 | LPR | | 515 | OFF (FIXED) |
| 2 | HTTP/IPP | ipp://xxx.xxx.xxx.xxx/ipp/printservice-2 | 4321 | ON |
| 3 | HTTP/IPP | ipp://xxx.xxx.xxx.xxx/ipp/printservice-3 | 5432 | OFF |

TABLE FOR MANAGING RETRANSMISSION PERMISSION/INHIBITION FOR
EACH INFORMATION PROCESSING APPARATUS (INHIBITION LIST) 1120

| ServiceID 1121 | UserAgent 1122 | UUID 1123 | MacADDR 1124 | IPADDR 1125 |
|---|---|---|---|---|
| 2 | desktopOS | * | * | * |
| 2 | tabletOS (ver.x) | d98c1dd4-008f-34b2-6980-0998ecf8427e | * | * |
| 2 | tabletOS (ver.y) | * | aa:bb:cc:dd:ee:ff | * |

1127
1128
1129

ASTERISK (*) INDICATES THAT ALL VALUES ARE INHIBITION TARGETS

PRINTING APPARATUS AND METHOD FOR CONTROLLING THE SAME FOR NOTIFYING OF OCCURRENCE OF AN ERROR

CROSS-REFERENCE TO RELATED APPLICATIONS

This application is a Continuation of U.S. patent application Ser. No. 17/013,338, filed Sep. 4, 2020, which claims the benefit of Japanese Patent Application No. 2019-166872, filed Sep. 13, 2019, both of which are hereby incorporated by reference herein in their entirety.

BACKGROUND

Field of the Disclosure

The present disclosure relates to a printing apparatus and a method for controlling the printing apparatus.

Description of the Related Art

An image forming apparatus such as a printer or a multifunction peripheral can accept a print job from various external apparatuses such as a personal computer (PC), a smart phone, and a tablet terminal. The image forming apparatus analyzes drawing data included in the received print job, generates image data, and forms an image on paper.

Depending on a format of the print job transmitted from an external apparatus, the image forming apparatus may be unable to analyze data in the format. Japanese Patent Application Laid-Open No. 2019-46075 discloses a technique for, if an error occurs when a print job is transmitted via a first path, retransmitting the print job via a second path.

Image quality and tint of print data may be different depending on the format of drawing data. Thus, if retransmission is constantly attempted in a different format at an occurrence of a print data error, the user may be unable to acquire an output with the intended image quality and tint.

In addition, if the print data error occurs, the print job is executed again from the beginning, and thus, some pages of an output material may possibly be redundantly printed.

SUMMARY

According to embodiments of the present disclosure, there is provided a printing apparatus configured to perform printing based on print data received from an information processing apparatus, the information processing apparatus transmitting print data to the printing apparatus, transmitting print data as a substitute for the print data to the printing apparatus based on first error information received from the printing apparatus, and not transmitting print data as a substitute for the print data upon receipt of second error information from the printing apparatus. The printing apparatus includes a detection unit configured to detect that the received print data includes data that cannot be processed by the printing apparatus, a determination unit configured to determine error information to be transmitted to the information processing apparatus as the first or the second error information based on information included in the print data, the print data having been detected by the detection unit to include the data that cannot be processed by the printing apparatus, and a transmission unit configured to transmit the error information determined by the determination unit to the information processing apparatus.

Further features of the present disclosure will become apparent from the following description of exemplary embodiments with reference to the attached drawings.

BRIEF DESCRIPTION OF THE DRAWINGS

FIG. 6A, which includes FIGS. 6A1 and 6A2, is a sequence diagram illustrating processing of retransmitting a print job at an occurrence of a data error according to the present exemplary embodiment.

FIG. 8 is a flowchart illustrating processing performed by the information processing apparatus to transmit a print job according to the present exemplary embodiment.

FIG. 11 is a diagram illustrating tables used by the printing apparatus to enable or disable the automatic retransmission function according to the present exemplary embodiment.

DESCRIPTION OF THE EMBODIMENTS

Exemplary embodiments of the present disclosure will be described in detail below with reference to the accompanying drawings. The following exemplary embodiments are not intended to be limiting, and not all combinations of features described in the present exemplary embodiments are deemed to be indispensable.

Figure 1:
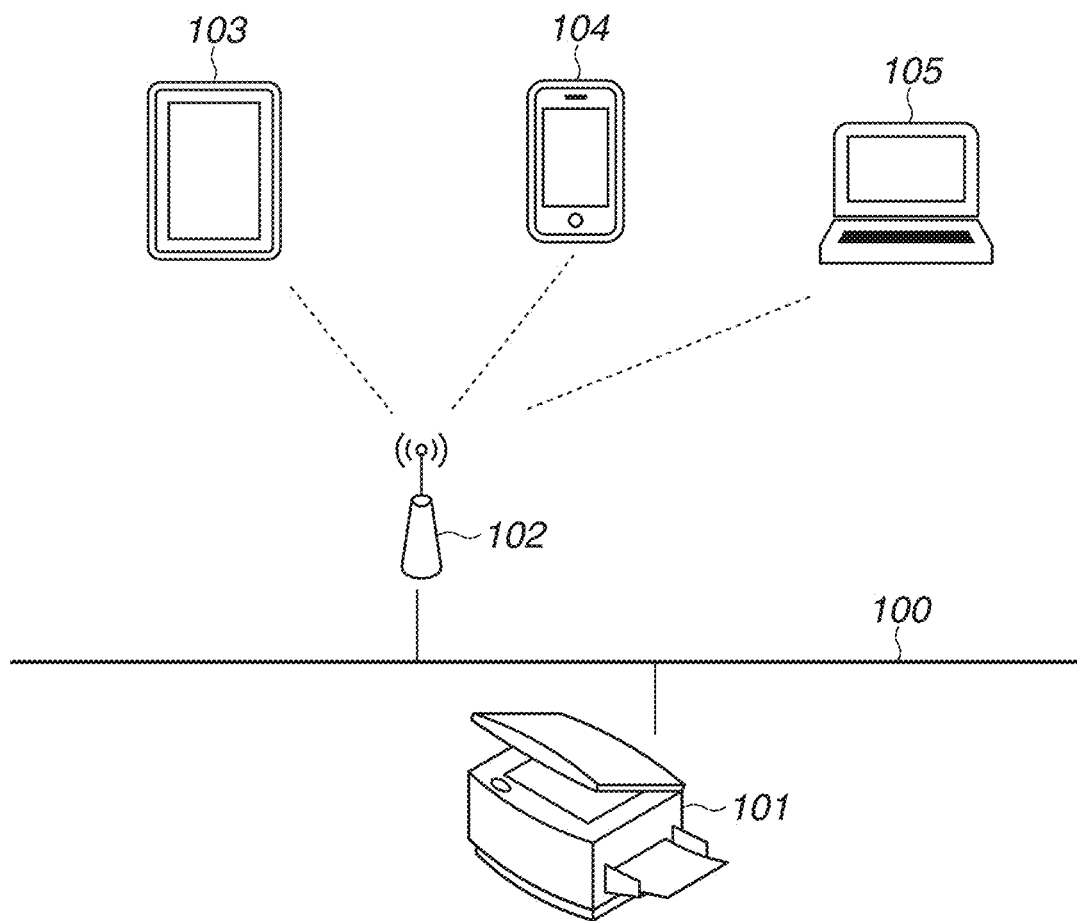
FIG. 1 is a diagram illustrating an example of a configuration of a printing system according to the present disclosure.

FIG. 1 is a diagram illustrating a configuration of a printing system according to a first exemplary embodiment of the present disclosure. A printing apparatus 101 and an access point (AP) 102 are connected to a local area network (LAN) 100. An information processing apparatus is connected to the LAN 100 via the AP 121, and the LAN 100 can connect to the printing apparatus 101 on the LAN 100 via a router. Examples of information processing apparatus according to the present exemplary embodiment include information processing apparatuses 103, 104, and 105 such as a tablet, a smart phone, and a personal computer (PC). In the following descriptions, the tablet, the smart phone, and the PC are collectively referred to as the information processing apparatuses. The above-described information processing apparatuses can transmit image data to the printing apparatus 101 via the LAN 100. The printing apparatus 101 can form an image based on the received image data on a recording medium such as paper. While the present exemplary embodiment will be described below centering on the above-described configuration as an example of a printing system, the present disclosure is not limited thereto. At least one information processing apparatus and printing apparatus may be communicably connected with each other via the LAN 100. A wireless network or a wired network is applicable.

Figure 2:
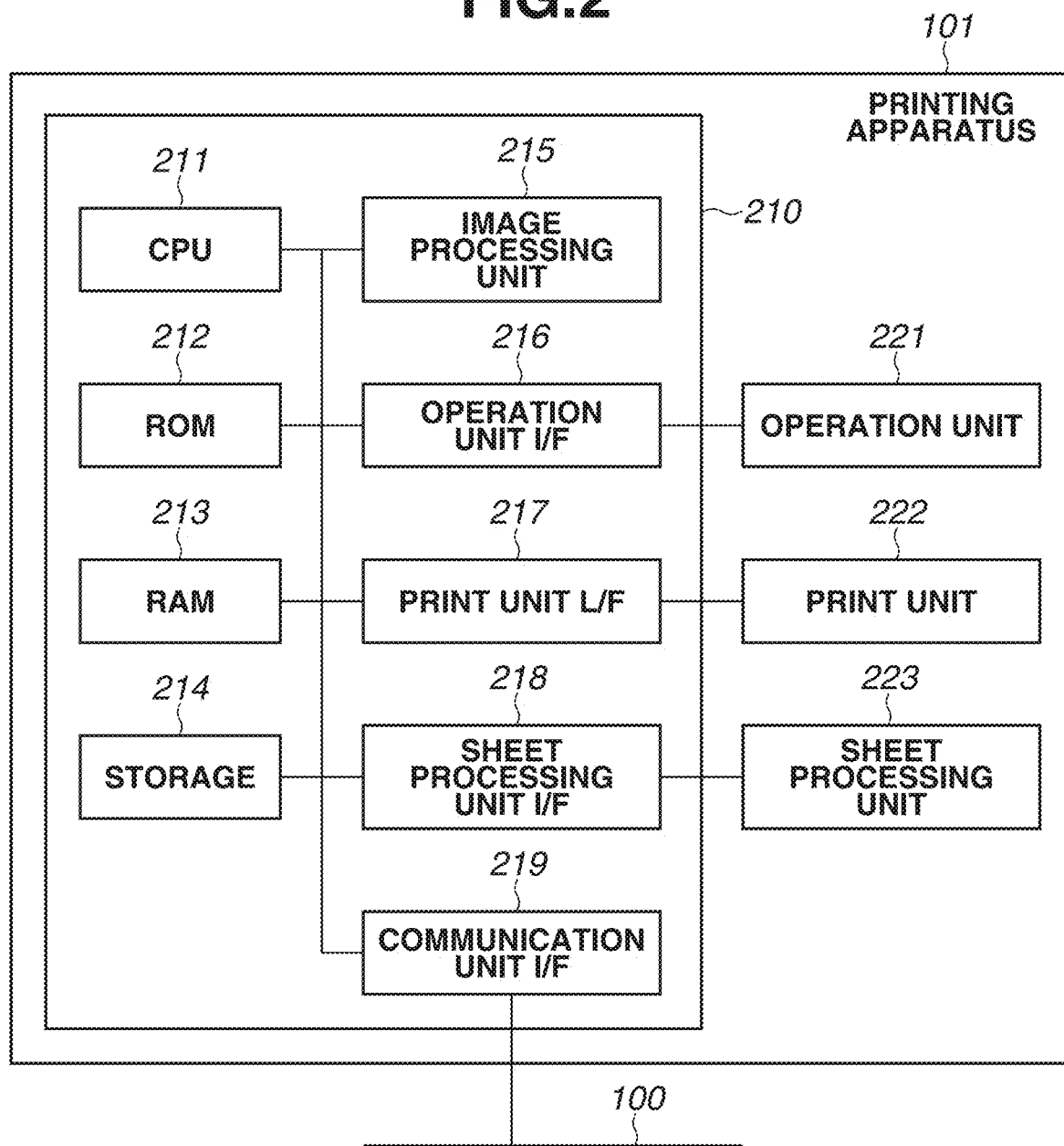
FIG. 2 is a block diagram illustrating an example of a hardware configuration of a printing apparatus.

FIG. 2 is a block diagram illustrating a hardware configuration of the printing apparatus 101 according to the present exemplary embodiment. The present exemplary embodiment will be described below centering on a printing apparatus as an example, and the printing apparatus may be a multifunction peripheral (MFP) including a scanner and a facsimile (FAX) function.

A control unit 210 including a central processing unit (CPU) 211 controls operation of the entire printing apparatus 101. The CPU 211 loads a program stored in a read only memory (ROM) 212 or a storage 214 into a random access memory (RAM) 213, and then executes the program to perform various controls such as a printing control and a reading control. The ROM 212 stores a control program and a boot program that can be executed by the CPU 211. The RAM 213 is the main memory of the CPU 211 and is used as a work area or a temporary storage area for loading various control programs. The storage 214 stores print data, image data, various programs, and various setting information. While the present exemplary embodiment uses an auxiliary memory such as a hard disk drive (HDD) as the storage 214, a nonvolatile memory such as a solid state drive (SDD) can be used.

In the printing apparatus 101 according to the first exemplary embodiment, one CPU 211 performs each process illustrated in flowcharts (described below) by using one memory (RAM 213), but other configurations are also applicable. For example, pluralities of CPUs, RAMs, ROMs and storages may be operated in a coordinated manner to perform each process illustrated in the flowcharts (described below). Part of the processing may be executed using hardware circuitry such as an Application Specific Integrated Circuit (ASIC) and a Field Programmable Gate Array (FPGA).

An operation unit interface (I/F) 216 connects an operation unit 221 and the control unit 210. The operation unit 221 is provided with a display unit having a touch panel function and various hardware keys, and functions as a display unit for displaying information and a reception unit for receiving a user instruction. A print unit I/F 217 connects a print unit 222 and the control unit 210. Image data generated by analyzing a print job received from the information processing apparatus is transmitted from the control unit 210 to the print unit 222 via the print unit I/F 217. The print unit 222 receives a control command and a print job to be printed via the control unit 210 and, based on the print job, prints an image on a sheet fed from a sheet cassette (not illustrated). A printing method of the print unit 222 may be the electrophotographic process or the inkjet process. Another printing method such as the thermal transfer method is also applicable. The control unit 210 is connected to the LAN 100 via a communication unit I/F 219. The communication unit I/F 219 receives a print job and information from the information processing apparatus 103, 104, or 105 on the LAN 100.

An image processing unit 215 has a raster image processor (RIP) function of expanding the job received from the information processing apparatus 103, 104, or 105 and generating print image data. The image processing unit 215 can perform resolution conversion and correction processing on the image data obtained by expanding the print job. While the present exemplary embodiment describes that the image processing unit 215 is implemented by hardware circuitry (ASIC or FPGA), the present disclosure is not limited thereto. For example, the printing apparatus 101 may further include a processor for image processing applications, and the processor can execute an image processing program to implement image processing and processing for print data rasterization. In this case, the processor and the CPU 211 operate in a coordinated manner to implement the flowcharts (described below). Further, the CPU 211 can execute a program for performing image processing to implement the image processing and the processing for print data rasterization. Alternatively, the image processing can be performed by a combination of these.

A sheet processing unit I/F 218 connects the control unit 210 and a sheet processing unit 223. The sheet processing unit 223 receives a control command from the control unit 210 and, based on the control command, performs post-processing on a sheet printed by the print unit 222.

Figure 3:
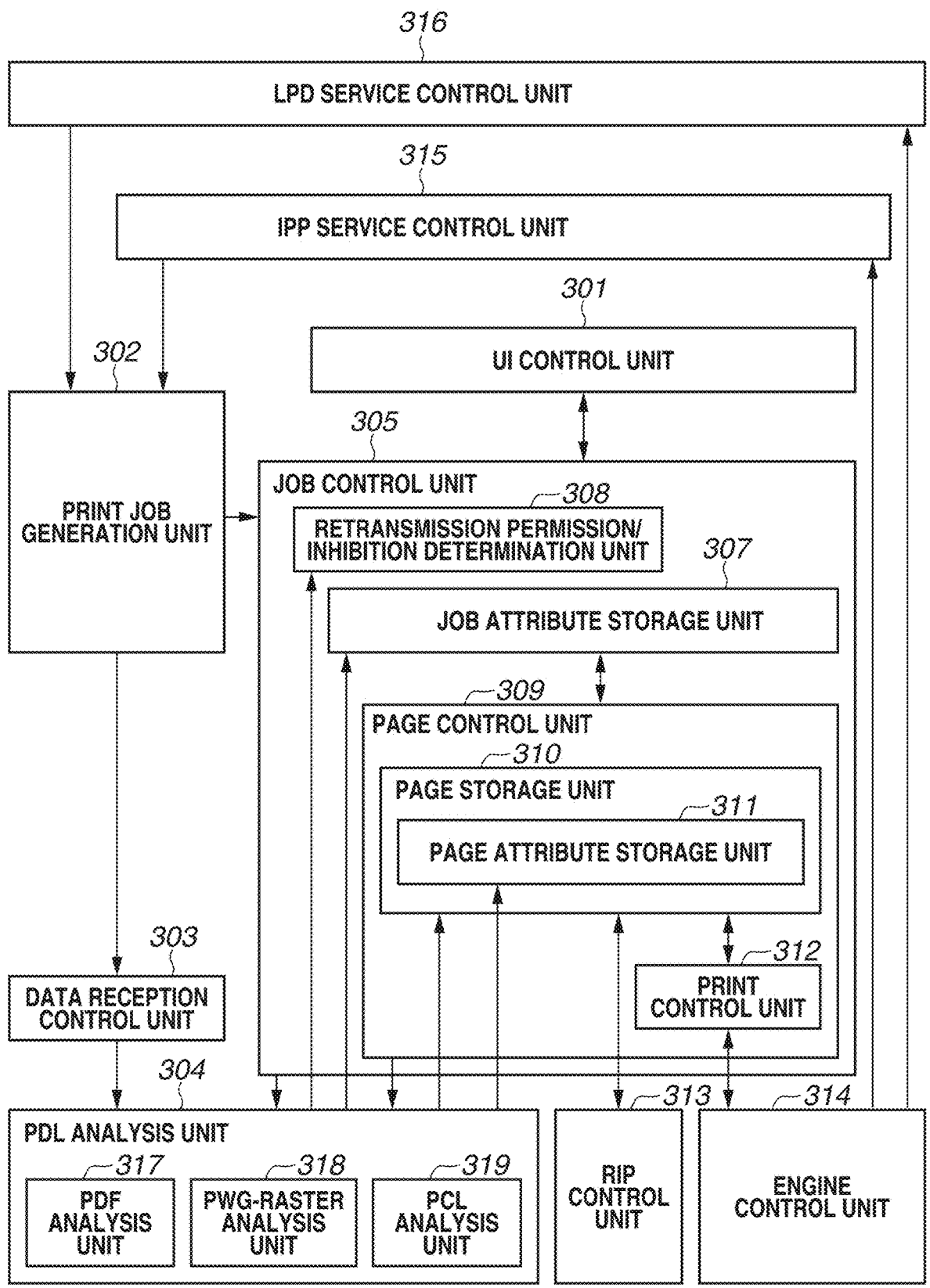
FIG. 3 is a function block diagram illustrating an example of a software configuration of the printing apparatus.

FIG. 3 is a function block diagram illustrating a software configuration of the printing apparatus 101 according to the first exemplary embodiment. In the present exemplary embodiment, each function block illustrated in FIG. 3 is implemented by the CPU 211 executing a program loaded into the RAM 213. An example will be described below centering on a case where the printing apparatus 101 communicates with the information processing apparatus 103. Alternatively, the printing apparatus 101 may communicate with the information processing apparatus 104 or 105.

A module for processing a print job from an Internet Printing Protocol (IPP) service control unit 315 as a first print service will be described below. Upon receipt of an inquiry from the information processing apparatus 103 to the printing apparatus 101 about capability thereof, the IPP service control unit 315 notifies the information processing apparatus 103 of printer capability information. After acquisition of the capability information about the printing apparatus 101, the information processing apparatus 103 generates a print job suitable for the printer and then transmits the print job to the printing apparatus 101. Processing for receiving print data is performed by the IPP service control unit 315. Upon receipt of an IPP print job from the information processing apparatus 103, the IPP service control unit 315 generates a new job in a job control unit 305 via a print job generation unit 302. Subsequently, the print job generation unit 302 writes job settings into a job attribute storage unit 307. Examples of attributes include the number of print copies, finishing, and Page Description Language (PDL) format information. The print job generation unit 302 transmits drawing data of the job to a data reception control unit 303 for temporary storage in parallel with storing the job settings in the job attribute storage unit 307. The data reception control unit 303 serves as a buffer area for a print job received by the print job generation unit 302 and stores the drawing data in the storage 214 for each print job.

A PDL analysis unit 304 included in the printing apparatus 101 according to the present exemplary embodiment includes a Portable Document Format (PDF) analysis unit 317, a Printer Working Group (PWG)-raster analysis unit 318, and a Printer Control Language (PCL) analysis unit 319, and the analysis units support respective formats. Upon receipt of an instruction from job control unit 305, the PDL analysis unit 304 receives print drawing data from the data reception control unit 303 and then performs analysis processing. With regard to page data generated by the PDL analysis unit 304, a page control unit 309 stores image data in a page storage unit 310 and stores page attribute information in a page attribute storage unit 311.

The page control unit 309 controls page analysis processing by the PDL analysis unit 304, RIP processing by a RIP control unit 313, and print control processing by a print control unit 312. The print control unit 312 acquires image data having undergone the RIP processing from the page storage unit 310, subjects the image data to cyan, magenta, yellow, and black (CMYK) color separation, and transmits resultant image data to an engine control unit 314. The engine control unit 314 receives the CMYK-separated image data in page units from the print control unit 312 and then performs printing processing of each page. A user interface (UI) control unit 301 acquires information about a condition of the print job currently being processed from the job control unit 305 and then displays a print job processing status on a UI screen.

A retransmission permission/inhibition determination unit 308 determines whether the print job is a retransmittable job based on information about the protocol, print service, and job format used to receive the print job and on identification information about individual apparatuses. The retransmission permission/inhibition determination unit 308 will be described in detail below with reference to FIGS. 7A and 7B.

In the case of a print service in which automatic retransmission processing is desired, the retransmission permission/inhibition determination unit 308 notifies a print client on a side of the information processing apparatus 103 of an error leading to a retransmission request in cooperation with the IPP service control unit 315 and a Line Printer Deamon (LPD) service control unit 316. On the other hand, in the case of a print service in which the automatic retransmission processing is not desired, the retransmission permission/inhibition determination unit 308 notifies the print client of an error not leading to the retransmission request.

If the PDL analysis unit 304 detects a data error during the analysis processing, the PDL analysis unit 304 notifies the job control unit 305 of the data error. The job control unit 305 determines the content of an error to be notified to the IPP service control unit 315 and the LPD service control unit 316 in cooperation with the retransmission permission/inhibition determination unit 308. For example, if the PDF analysis unit 317 detects a PDF data error during processing of an IPP job in the PDF format, then, in a case where the printing apparatus 101 permits retransmission of the job to the information processing apparatus 103 in a format other than PDF (e.g. PWG-raster format), the PDF analysis unit 317 converts the detected error into an "unprintable-error" and notifies the job control unit 305 of the error. On the other hand, in a case where the retransmission is not permitted, the PDF analysis unit 317 converts the detected error into a "document-format-error" and notifies the job control unit 305 of the error. The job control unit 305 notifies the information processing apparatus 103 of the notified error.

Next, a module for processing a print job received by the LPD service control unit 316 as a second print service will be described below.

The LPD service control unit 316 receives a print job input based on a Line Printer Remote (LPR) protocol from the information processing apparatus 103 and generates a new job in the job control unit 305 via the print job generation unit 302. Subsequently, the LPD service control unit 316 writes various print parameters set by using an LPR command into the job attribute storage unit 307 as job settings. The number of print copies is an example of the print parameters. The LPD service control unit 316 transmits drawing data of the job to the data reception control unit 303 for temporary storage in parallel with attribute processing. The processing such as storage of received data, PDL analysis, RIP processing, and print processing are similar to the processing performed on a job from the IPP service control unit 315.

Figure 4:
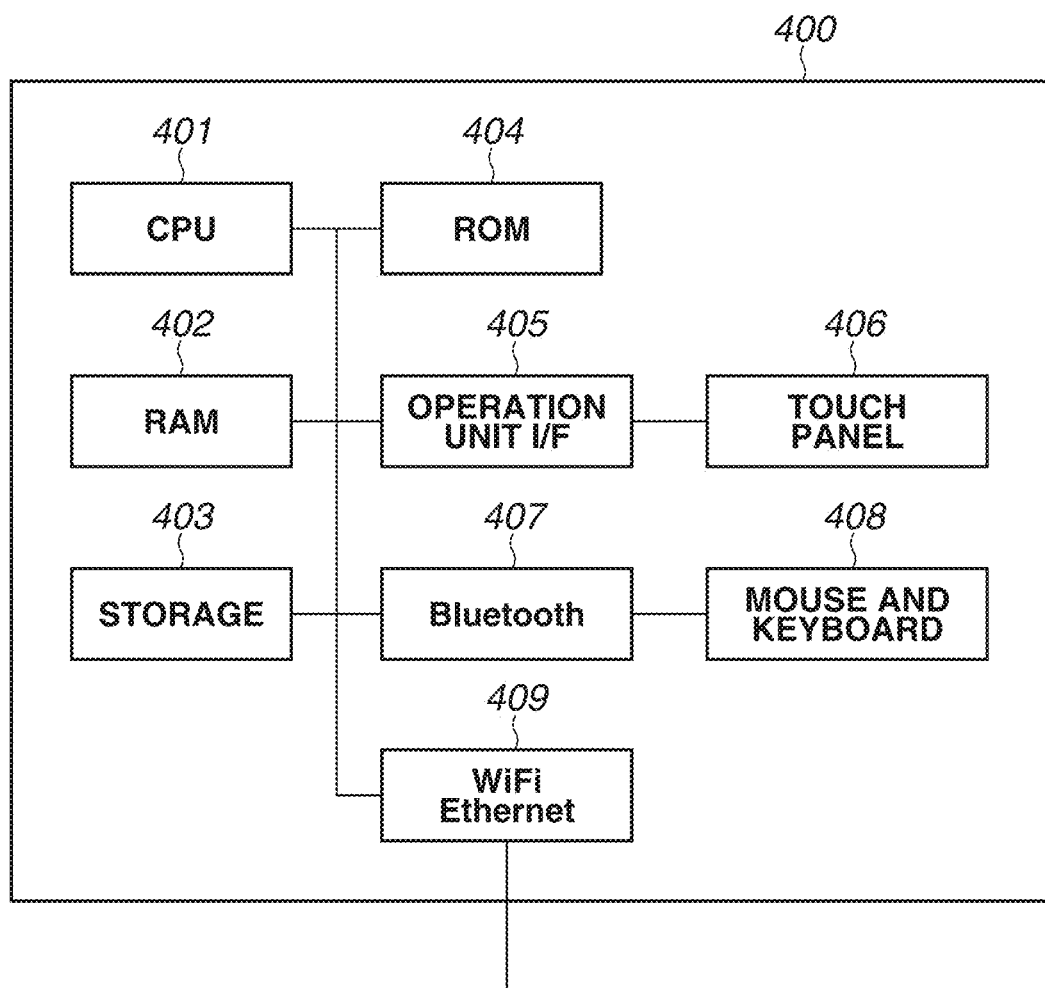
FIG. 4 is a block diagram illustrating an example of a hardware configuration of an information processing apparatus.

FIG. 4 is a block diagram illustrating a hardware configuration of the information processing apparatus 103. While the configuration of the information processing apparatus 103 will be described below as an example, the information processing apparatuses 104 and 105 may each have a similar configuration.

A control unit 400 including a CPU 401 controls the operation of the entire information processing apparatus 103. The CPU 401 loads a program stored in a ROM 404 or a storage 403 into a RAM 402 and then executes the program to perform various control operations such as a control of a print setting screen, generation of print data, and transmission of a print job.

The ROM 404 stores a control program and a boot program that can be executed by the CPU 401. The RAM 402 is a main memory of the CPU 401 and is used as a work area or a temporary storage for loading various programs. The storage 403 stores an operating system (OS), an application, an OS printing framework, a print job generated by the OS printing framework, and various setting information. While the present exemplary embodiment uses an auxiliary memory such as an HDD as the storage 403, a nonvolatile memory such as an SDD can be used.

A touch panel 406 is connected to an operation unit I/F 405 and notifies an application operating on the CPU 401 of not only screen drawing for each application and the print setting screen but also a touch operation by the user. A mouse and key board 408 is connected to the control unit 400 via Bluetooth 407 as required. The control unit 400 is connected to the LAN 100 via a WiFi/Ethernet circuit.

A Wi-Fi Ethernet 409 is a hardware module for connecting the information processing apparatus 103 to the AP 102.

Figure 5A:
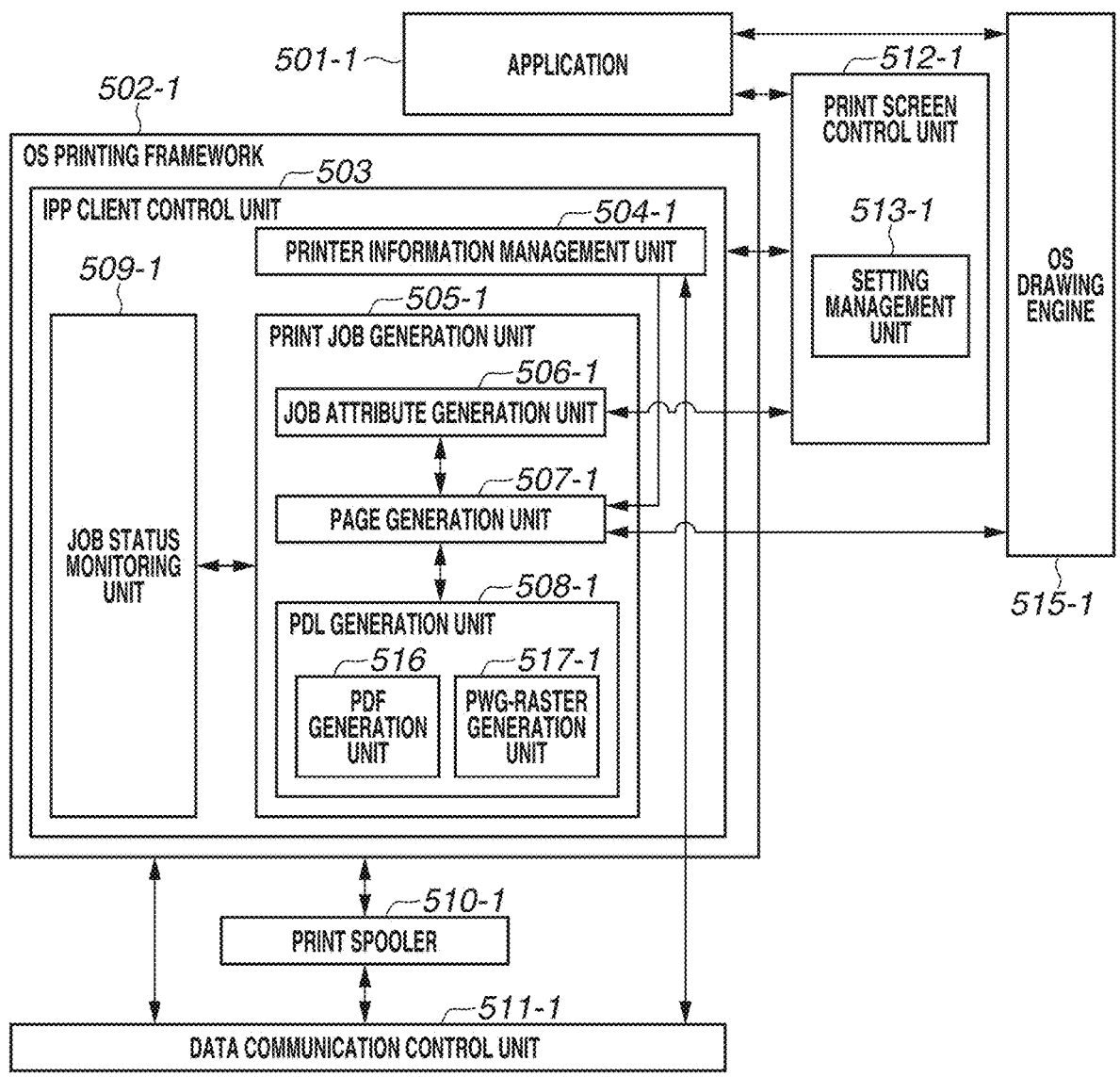
FIGS. 5A and 5B are function block diagrams each illustrating an example of a software configuration of the information processing apparatus.

FIG. 5A illustrates a software configuration of the information processing apparatus 103 that generates and transmits a print job using an IPP service. Each of the function blocks is implemented by the CPU 401 executing a program loaded into the RAM 402.

An application 501-1 is an arbitrary application installed on the information processing apparatus 103 by the user. The application 501-1 includes general applications such as a word processor, spreadsheet, database, email program, and web browser.

An IPP client control unit 503 includes a printer information management unit 504-1, a print job generation unit 505-1, and a job status monitoring unit 509-1.

The printer information management unit 504-1 makes an inquiry to the printing apparatus 101 via a data communication control unit 511-1 and acquires and stores capability information about the printing apparatus 101. The information stored in the printer information management unit 504-1 is referred to by the print job generation unit 505-1.

A print screen control unit 512-1 includes a setting management unit 513-1 and displays the print setting screen in response to a call from the application 501-1. The user makes print settings on the print setting screen and issues a print instruction.

The print job generation unit 505-1 includes a job attribute generation unit 506-1, a page generation unit 507-1, and a PDL generation unit 508-1. The print job generation unit 505-1 receives an instruction from the print screen control unit 512-1 and generates a print job. The job attribute generation unit 506-1 generates a job attribute and a document attribute based on setting items on the print setting screen. The page generation unit 507-1, in cooperation with an OS drawing engine 515-1 and the PDL generation unit 508-1, converts the drawing data generated by the application 501-1 into PDL data supported by the printing apparatus 101. Then, the page generation unit 507-1 transmits the generated PDL data to the printing apparatus 101 via a print spooler 510-1. A format of the PDL data generated by the page generation unit 507-1 is a format supported by the PDL generation unit 508-1 of the information processing apparatus 103 among formats notified by the printing apparatus 101 as a response about the capability.

The job status monitoring unit 509-1 monitors a status of the job transmitted to the printing apparatus 101. Upon receipt of a first error notification due to drawing data in a first format (PDF) generated by a PDF generation unit 516, the job status monitoring unit 509-1 instructs the print job generation unit 505-1 to transmit the job that has been converted into another format supported by the printing apparatus 101. The print job generation unit 505-1 generates drawing data in a second format (PWG-raster) generated by a PWG-raster generation unit 517-1 and transmits the print job to the printing apparatus 101. In the present exemplary embodiment, the first error notification refers to an error indicating acknowledgment of retransmission of a print job. Such a configuration makes it possible to continue printing even if the printing apparatus 101 is unable to analyze the drawing data in the first format.

When the printing apparatus 101 transmits a second error notification (error that does not permit retransmission) due to data, the job status monitoring unit 509-1 does not transmit the drawing data in the second format but ends the job as an error.

The data communication control unit 511-1 transmits and receives communication for printer management and messages for job transmission and job management generated by the IPP client control unit 503 to the printing apparatus 101.

Figure 5B:
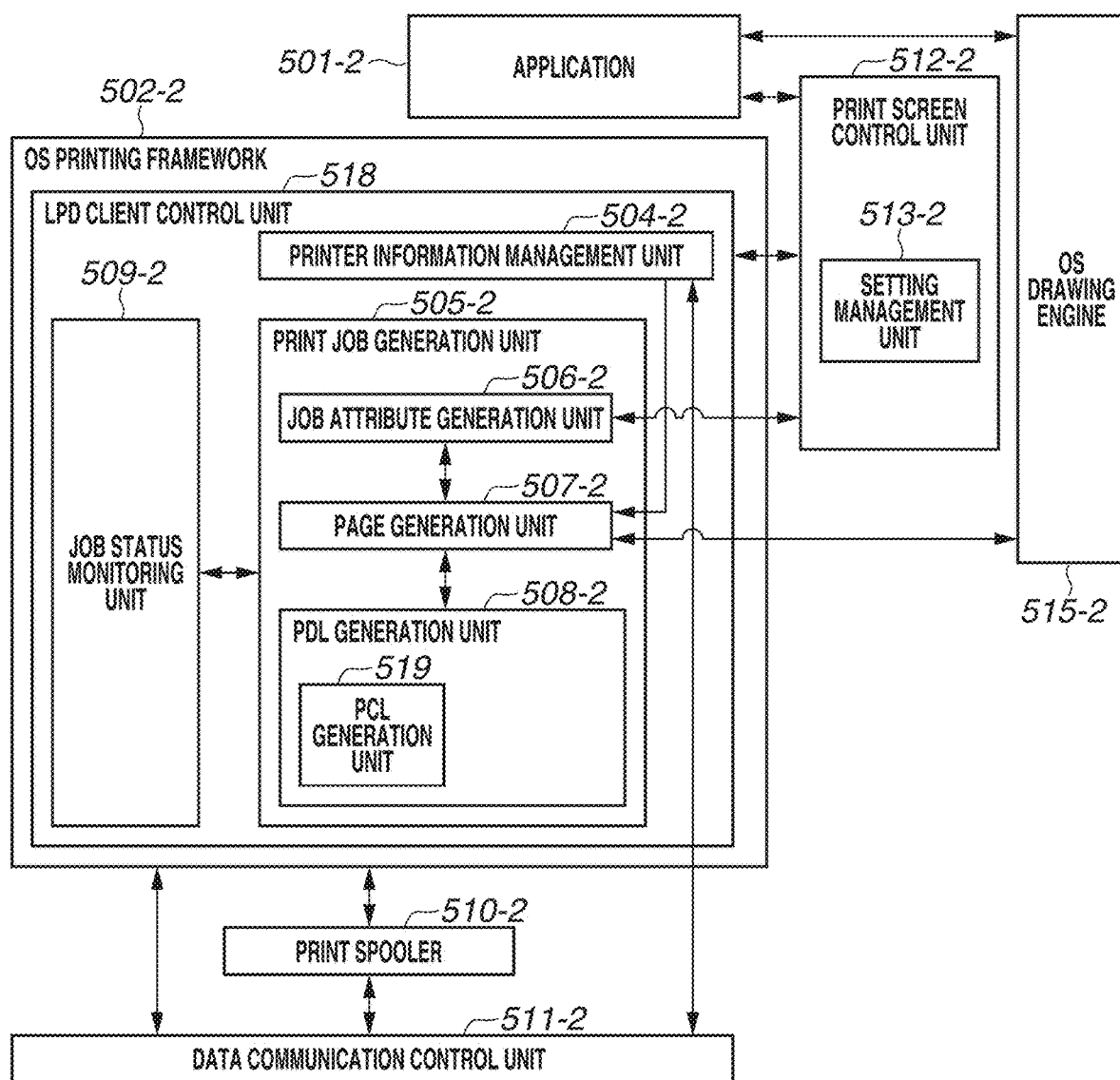

FIG. 5B illustrates a software configuration of the information processing apparatus 103 that generates and transmits a print job using an LPD service. Each of these function blocks is implemented by the CPU 401 executing a program loaded into the RAM 402.

A PDL generation unit 508-2 of an LPD client control unit 518 converts a page image generated by an OS drawing engine 515-2 into the PDL format specified by an application 501-2. For example, if a print queue selected by the application 501-2 is associated with a PCL generation unit 519 in advance, the format generated by the print job generation unit 505-1 is fixed to PCL. The print job is transmitted to the printing apparatus 101 via a print spooler 510-2 and a data communication control unit 511-2. After the transmission, a job status monitoring unit 509-2 monitors a job status. If an error due to transmitted data occurs on the printing apparatus 101, the printing apparatus 101 transmits only the second error notification that does not permit job retransmission to the job status monitoring unit 509-2 of an LPR client. This is because, in an LPR-based backbone printing system, a print failure accompanying a data error is generally visually checked by the user. Thus, the job status monitoring unit 509-2 does not issue a retransmission request to a print job generation unit 505-2 but handles the job as an error and ends the processing.

One information processing apparatus 103 may include both the IPP client control unit 503 and the LPD client control unit 518 or may include either one. The applications 501-1 and 501-2, the print screen control units 512-1 and 512-2, and the setting management units 513-1 and 513-2 may be the same software blocks or different software blocks. This also applies to the OS drawing engines 515-1 and 515-2, the print spoolers 510-1 and 510-2, and the data communication control units 511-1 and 511-2. The same applies to the printer information management units 504-1 and 504-2, the job status monitoring units 509-1 and 509-2, and the PWG-raster generation unit 517-1. The same also applies to the job attribute generation units 506-1 and 506-2 and the page generation units 507-1 and 507-2.

In the present exemplary embodiment, the user presets print services to be used on the operation unit 221 of the printing apparatus 101.

Figure 10A:
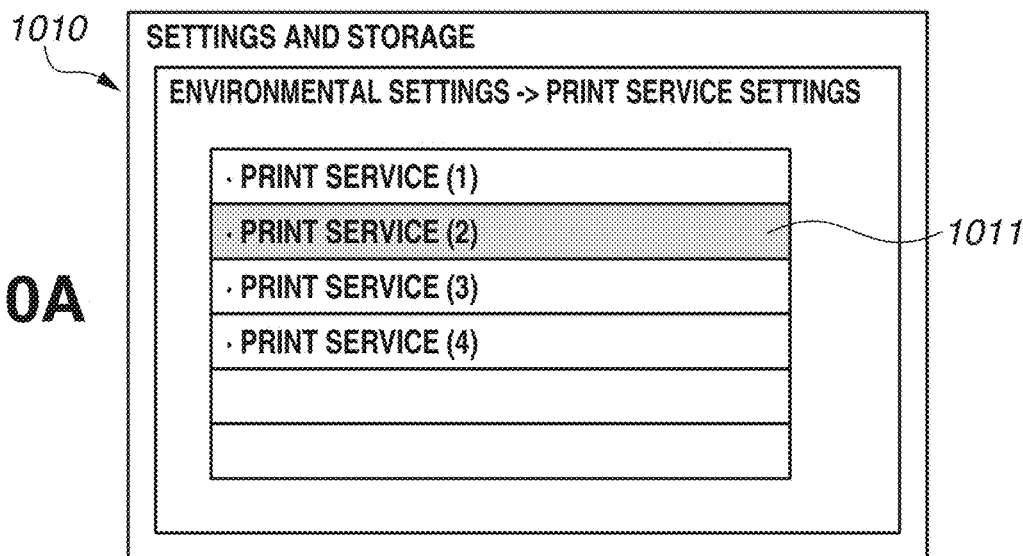
FIGS. 10A, 10B, and 10C are diagrams each illustrating an example of screens for enabling or disabling an automatic retransmission function on the operation unit of the printing apparatus according to the present exemplary embodiment.
Figure 10B:
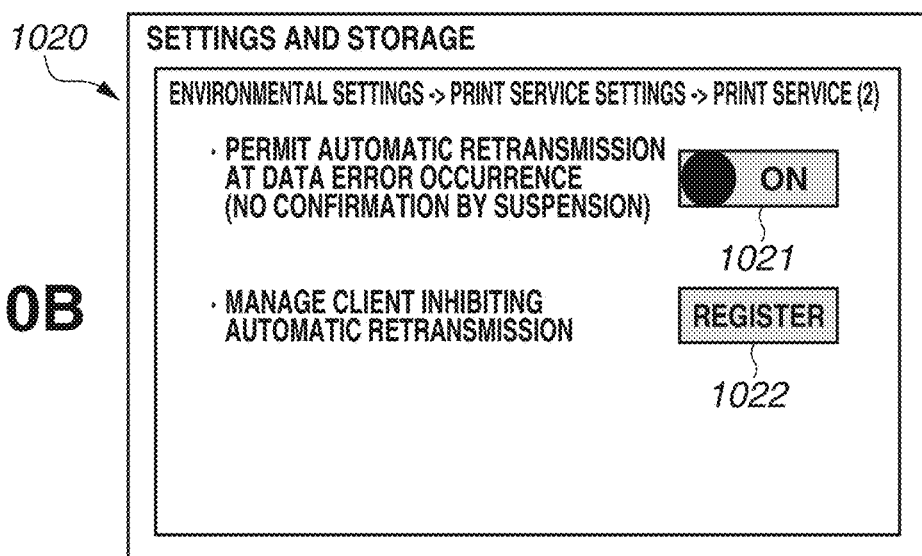
Figure 10C:
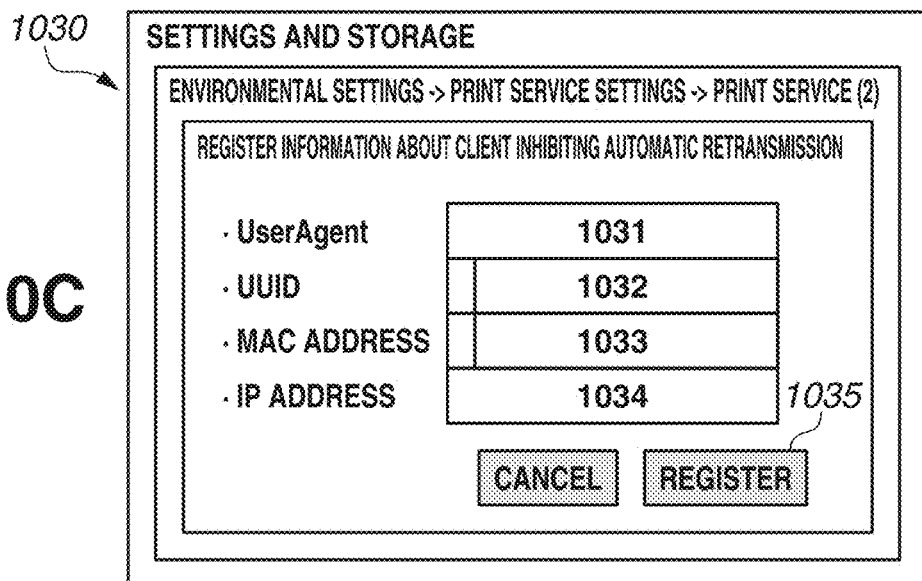

FIGS. 10A, 10B, and 10C illustrate examples of setting screens for making settings for respective print services. FIG. 10A illustrates a screen for selecting a print service for which a setting is made. In this case, the user selects "Print Service (2)".

FIG. 10B illustrates a screen for setting whether to enable or disable the function of automatic retransmission at an occurrence of a data error using the print service (2). A button 1021 is used to select whether to perform automatic retransmission if an error occurs in analyzing page drawing data received using the print service (2). When the automatic retransmission at the occurrence of a data error is enabled, the printing apparatus 101 does not suspend the job to which the error has occurred but cancels the job and then transmits information about the error for which automatic job transmission is required to the information processing apparatus 103. A button 1022 is used to disable the automatic job transmission at the occurrence of a data error if the information processing apparatus 103 that has transmitted the job using the print service (2) is a specific information processing apparatus.

FIG. 10C illustrates an example of a screen displayed on the operation unit 221 when the button 1022 illustrated in FIG. 10B is selected. FIG. 10C is a screen for setting information about an information processing apparatus, in which the automatic retransmission is disabled even if an automatic retransmission function of the print service is enabled. "UserAgent" 1031 is an area for setting information for identifying hardware or software used when the information processing apparatus in which the automatic retransmission is disabled transmits a print job. "Universally unique identifier (UUID)" 1032 is an area for registering information for identifying the individual information processing apparatus in which the automatic retransmission is disabled. "Media access control (MAC) address" 1033 is an area for setting a MAC address of the information processing apparatus in which the automatic retransmission is disabled. "Internet Protocol (IP) address" 1034 is an area for setting the IP address of an information processing apparatus in which the automatic retransmission is disabled. The UserAgent, UUID, MAC address, and IP address are pieces of information for identifying that the print job is a print job transmitted from software or hardware in which the automatic retransmission is disabled.

The contents set via the setting screens illustrated in FIGS. 10A, 10B, and 10C are managed by Tables 1110 and 1120 illustrated in FIG. 11. Tables 1110 and 1120 store settings at which the print job retransmission is disabled at the occurrence of a data error, and the settings are stored in the ROM 212 of the printing apparatus 101.

Table 1110 manages enabling or disabling of the retransmission enabled/disabled for each print service. Table 1110 includes management items "ServiceID" 1111, "ServiceType" 1112, "ServiceURL" 1113, "ServicePort" 1114, and "Retransmission SW" 1115.

The "ServiceID" 1111 is identification information for identifying a print service. A common value is used for the "ServiceID" 1111 in Tables 1110 and 1120. The "ServiceType" 1112 is a piece of information indicating whether the print service is in an LPR format or a Hypertext Transfer Protocol (HTTP)/IPP format. The "ServiceURL" 1113 is a Uniform Resource Locator (URL) notified by the IPP service control unit 315 of the information processing apparatus 103, and is a destination URL to be used when the information processing apparatus 103 transmits a print job. The "ServiceURL" 1113 is a URL that cannot be changed by the user. The "ServicePort" 1114 is a port number notified by the IPP service control unit 315 or the LPD service control unit 316, and is used to receive a print job in each of the print services. The "ServicePort" 1114 is also a port number that cannot be changed by the user. The "Retransmission SW" 1115 is a value indicating whether to automatically retransmit page drawing data if the printing apparatus 101 fails in analyzing the page drawing data. In the "Retransmission SW" 1115, "OFF" indicates that the automatic retransmission function is disabled, and "ON" indicates that the automatic retransmission function is enabled. In this case, the automatic retransmission is disabled for a print service in which the "ServiceType" 1112 is LPR, and the setting cannot be changed by the user. For a print service in which the "ServiceType" 1112 is HTTP/IPP, the automatic retransmission can be set by the user via a screen illustrated in FIG. 10B. In this case, the automatic retransmission function is enabled for the print service in which the "ServiceID" 1111 is "2". The automatic retransmission function is disabled for the print service in which the "ServiceID" 1111 is In this example, in a case where the "ServiceType" 1112 is HTTP/IPP, the automatic retransmission function is enabled or disabled by a user setting. Even in the case where the "ServiceType" 1112 is HTTP/IPP, the automatic retransmission function may be fixedly disabled or fixedly enabled depending on the values of the "ServiceURL" 1113 and the "ServicePort" 1114.

Table 1120 will be described below. Table 1120 stores conditions for disabling the automatic retransmission function. Table 1120 reflects the settings made on the setting screen illustrated in FIG. 10C. Table 1120 includes management items "ServiceID" 1121, "UserAgent" 1122, "UUID" 1123, "MacADDR" 1124, and "IPADDR" 1125.

The "ServiceID" 1121 is identification information for identifying a print service. The "UserAgent" 1122 is a piece of information set in the "UserAgent" 1031 illustrated in FIG. 10C. The "UUID" 1123 is a piece of information set in the "UUID" 1032 illustrated in FIG. 10C. "MacADDR" 11124 is a piece of information set in "MAC Address" 1033 illustrated in FIG. 10C. The "IPADDR" 1125 is a piece of information set in the "IP address" 1034 illustrated in FIG. 10C. With regard to FIG. 10C, not all of items of UUID, MacADDR, and IPADDR need to be set. Table 1120 stores an asterisk (*) for an unset item.

When the information processing apparatus as a job transmission source matches the management items registered in Table 1120, the retransmission permission/inhibition determination unit 308 notifies each print service that the information processing apparatus does not permit the automatic retransmission.

For example, a record 1127 indicates that ServiceID information is "2" and that UserAgent information is "desktopOS". If the transmission source that has transmitted print data satisfies the above-described condition, the automatic retransmission is not performed even if the ServiceID information of the used print service is "2". Likewise, a record 1128 indicates that the automatic retransmission is not permitted when the UserAgent information is "tabletOS" and UUID information is "d98c1dd4-008f-34b2-6980-0998ecf8427e". A record 1129 indicates that the automatic retransmission is not permitted when the UserAgent information is "tabletOS" and the MacADDR information is "aa:bb:cc:dd:ee:ff".

FIGS. 6A1 to 6C are sequence diagrams in a case where the information processing apparatus 103 transmits a job to the printing apparatus 101 and the printing apparatus 101 detects an error in print data and notifies the information processing apparatus 103 of the error.

FIGS. 6A1 and 6A2 are a sequence diagram in a case where the information processing apparatus 103 transmits a print job to the printing apparatus 101 by using IPP printing employed by mobile print services. FIGS. 6A1 and 6A2 illustrate an example case where, if the printing apparatus 101 fails in the analysis of the print job transmitted by the information processing apparatus 103, the information processing apparatus 103 changes the drawing data format and then automatically performs retransmission.

In step S6101, the user operates the application 501-1 to specify display of a print setting screen of the printing apparatus to be used for printing and then selects the printing apparatus to be used for printing. In this case, the printing apparatus to be used for printing is selected at a timing when the display of the print setting screen is specified. Alternatively, a default printing apparatus may be selected when the display of the print screen is specified.

In step S6102, the information processing apparatus 103 transmits a request for acquiring capability information about the printing apparatus 101 selected on the print setting screen, to the printing apparatus 101.

In step S6103, the printing apparatus 101 notifies the information processing apparatus 103 of the capability information about the printing apparatus 101. In step S6103, the printing apparatus 101 notifies the information processing apparatus 103 of supported drawing data formats and executable finisher functions. The information processing apparatus 103 instructs the touch panel 406 to display the print setting screen based on the capability information notified by the printing apparatus 101.

In step S6104, the user operates the displayed print setting screen to make print settings and then presses a print button. In step S6105, the information processing apparatus 103 generates a job ticket based on the settings made on the print setting screen and then transmits a request for verifying the content of the job ticket to determine whether the generated job can be processed on the printing apparatus 101. Information described in the job ticket generated by the information processing apparatus 103 includes the drawing data format (e.g., PDF) and the number of copies (e.g., 5). In step S6106, the printing apparatus 101 transmits a verification result indicating whether the content of the received job ticket can be processed to the information processing apparatus 103. In step S6106, if the printing apparatus 101 determines that processing described in the job ticket is executable, the printing apparatus 101 notifies the information processing apparatus 103 of "successful-ok". In step S6107, the information processing apparatus 103 transmits a job generation request (print ticket information notification) to the printing apparatus 101.

In step S6109, the printing apparatus 101 notifies the information processing apparatus 103 of print job generation permission. In step S6110, the information processing apparatus 103 transmits the page drawing data (PDL data) of the print job to the printing apparatus 101. In this case, the information processing apparatus 103 transmits the drawing data in the PDF format. In step S6111, upon completion of receipt of the page drawing data, the printing apparatus 101 notifies the information processing apparatus 103 of completion of the receipt of the page drawing data (PDL data). Then, in step S6112, the PDL analysis unit 304 of the printing apparatus 101 analyzes the page drawing data received in step S6111. In this case, the PDF analysis unit 317 performs the analysis processing since the page drawing data is in the PDF format. In this case, the PDF analysis unit 317 detects an uninterpretable command in a PDF file. Accordingly, the PDF analysis unit 317 notifies the retransmission permission/inhibition determination unit 308 of the job control unit 305 of a data error notification. The job control unit 305 performs processing of canceling the job and then sets a job status to "Canceled". This enables the printing apparatus 101 to receive a job retransmitted by the information processing apparatus 103. The job control unit 305 stores a cause of canceling the job that has been aborted because of an error as a job history. This enables the user to confirm afterward cancellation of the job and a reason for the cancellation of the job.

Meanwhile, upon receipt of the notification in step S6111, in step S6113, the information processing apparatus 103 makes an inquiry to the printing apparatus 101 about a job processing status through periodical polling.

The printing apparatus 101 checks an execution status of the job of which the inquiry about the processing status has been received from the information processing apparatus 103. In this case, the job is being subjected to cancel processing due to a data error. In step S6114, based on the determination by the retransmission permission/inhibition determination unit 308, the job control unit 305 of the printing apparatus 101 determines that the retransmission is possible, and determines details of the error to be notified to the information processing apparatus 103. Based on processing described below in FIG. 7A, the information processing apparatus 103 determines the error to be notified to the printing apparatus 101 as a first error notification (unprintable-error).

In step S6115, the printing apparatus 101 notifies the information processing apparatus 103 that the job status is "Canceled" and then transmits the first error notification (unprintable-error) to the information processing apparatus 103. Upon receipt of a job cancellation notification, the information processing apparatus 103 deletes the job in the print spooler 510-1.

This completes the sequence in steps S6105 to S6115 in which the IPP job in the PDF format is transmitted and the processing is canceled because of a data error.

In step S6115, the job status monitoring unit 509-1 of the information processing apparatus 103 receives a job cancel notification including the first error notification that permits the retransmission from the printing apparatus 101. In step S6116, the job status monitoring unit 509-1 of the information processing apparatus 103 instructs the print job generation unit 505-1 to transmit the job with the page drawing data in a format different from the PDF format. The retransmission determination by the information processing apparatus 103 will be described in detail below with reference to FIG. 8.

In step S6117, the information processing apparatus 103 generates a job ticket based on the settings made on the print setting screen. The information processing apparatus 103 transmits a request for verifying the content of the job ticket to the printing apparatus 101 to determine whether the generated job can be processed. Information described in the job ticket transmitted to the printing apparatus 101 in step S6117 includes the data format (e.g., PWG-raster) and the number of copies (e.g., 5). As described above, the data format described in the job ticket transmitted to the printing apparatus 101 in step S6117 is different from the data format described in the job ticket transmitted to the printing apparatus 101 in step S6105. The settings of the job ticket generated in step S6117 are similar to the settings of the job ticket transmitted in step S6105 except for a data format setting.

In step S6118, if there is no problem with the job ticket, the printing apparatus 101 notifies the information processing apparatus 103 of "successful-ok". In step S6119, the information processing apparatus 103 transmits a job generation request (print ticket information notification) to the printing apparatus 101. In step S6120, based on the print format specified in the job ticket, the retransmission permission/inhibition determination unit 308 of the printing apparatus 101 stores, in a memory, the fact that the print job to be generated is a print job that is not a retransmission target. In the present exemplary embodiment, the print format specified in the job ticket is PWG-raster, and thus, the retransmission permission/inhibition determination unit 308 stores, in the memory, the fact that the print job is a print job that is not a retransmission target.

In step S6121, the printing apparatus 101 notifies the information processing apparatus 103 of print job generation permission. In step S6122, the information processing apparatus 103 transmits the page drawing data (PDL data) of the print job to the printing apparatus 101. In this case, the information processing apparatus 103 transmits the page drawing data in the PWG-raster format.

In step S6123, the printing apparatus 101 completes receipt of the page drawing data and notifies the information processing apparatus 103 of completion of the receipt of the page drawing data (PDL data). In step S6124, the printing apparatus 101 analyzes the received page drawing data to generate image data and then prints the data. Upon completion of printing based on the received page drawing data, the printing apparatus 101 sets the job status to "Completed".

Meanwhile, upon receipt of the receipt completion notification in step S6123, in step S6125, the information processing apparatus 103 makes an inquiry to the printing apparatus 101 about the job processing status through periodical polling. Upon receipt of the inquiry about the job processing status from the information processing apparatus 103, in step S6126, the printing apparatus 101 notifies the information processing apparatus 103 that output of the job has normally been completed.

Upon receipt of the notification in step S6126, in step S6127, the job status monitoring unit 509-1 of the information processing apparatus 103 recognizes that the job is completed. The job status monitoring unit 509-1 deletes the job from the print spooler 510-1. This completes the sequence in steps S6117 to S6127 in which the IPP job in the PWG-raster format is retransmitted and printing is completed.

The sequence illustrated in FIGS. 6A1 and 6A2 has been described above centering on the example case where an error occurred in the analysis of the page drawing data in step S6112. If the error does not occur in the page drawing data in step S6112, in step S6115, the printing apparatus 101 notifies the information processing apparatus 103 of a status indicating that the job has been normally completed. Then, the information processing apparatus 103 deletes the job from the print spooler 510-1 and does not perform the subsequent processing.

Referring to FIGS. 6A1 and 6A2, in a case where a setting is made to permit retransmission of a print job even if the analysis of the drawing data in the first format fails, the printing apparatus 101 transmits the first error notification that permits the retransmission to the information processing apparatus 103. Upon receipt of the first error notification, the information processing apparatus 103 transmits the drawing data in the second format to the printing apparatus 101. Such a setting enables the job to be automatically executed again without the user retransmitting the print job.

Figure 6B:
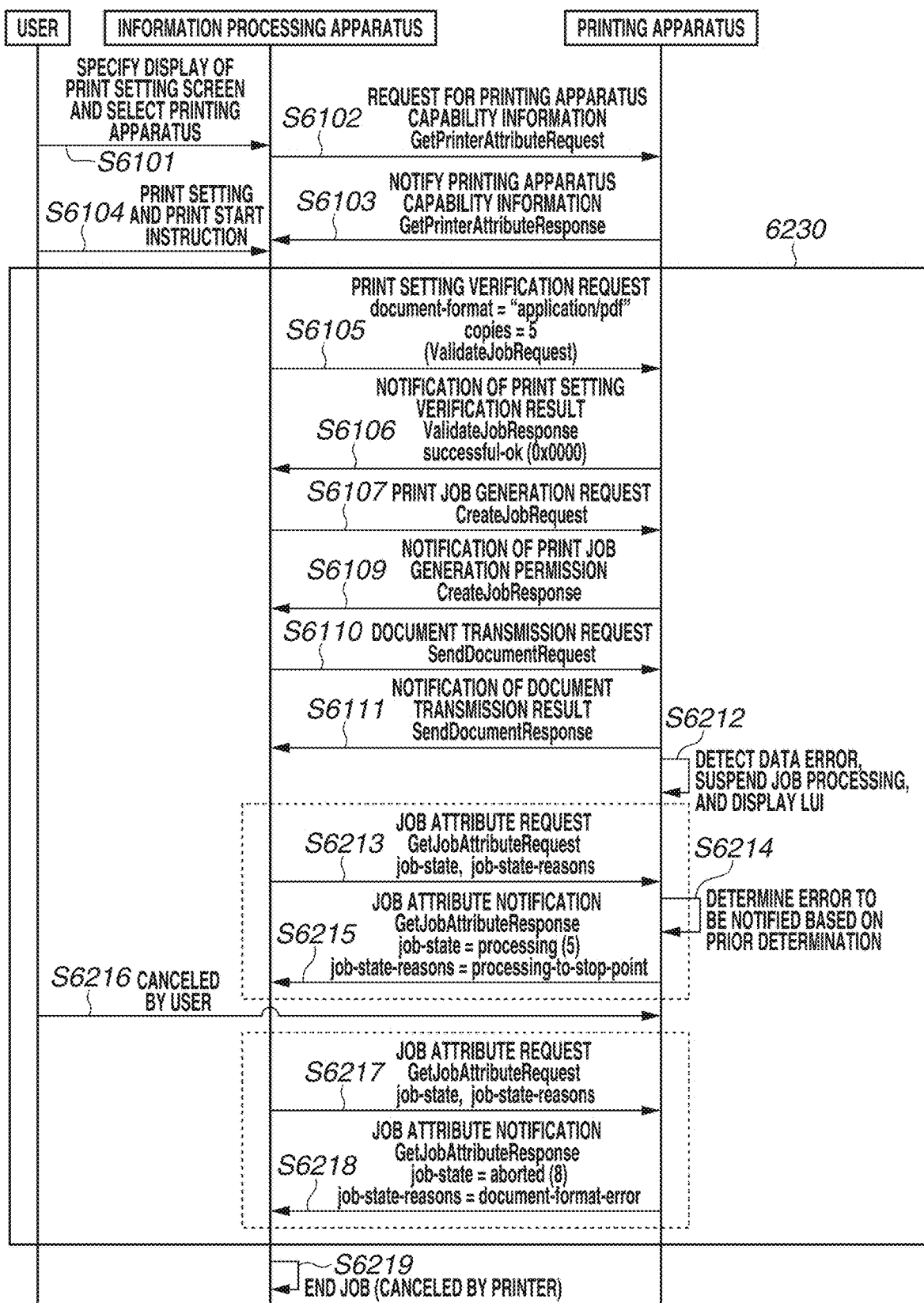
FIG. 6B is a sequence diagram illustrating processing of not retransmitting a print job at the occurrence of a data error according to the present exemplary embodiment.

FIG. 6B illustrates a sequence of IPP printing similar to the sequence illustrated in FIGS. 6A1 and 6A2. Referring to FIG. 6B, in a case where the printing apparatus 101 cannot analyze the drawing data transmitted by the information processing apparatus 103, the printing apparatus 101 does not permit the automatic retransmission from the information processing apparatus 103.

Referring to FIG. 6B, steps S6101 to S6107 and S6109 to S6111 are steps for performing similar processing to that in FIGS. 6A1 and 6A2. Thus, the same reference numerals as those in FIGS. 6A1 and 6A2 are assigned, and redundant descriptions thereof will be omitted.

In step S6212, the PDF analysis unit 317 of the printing apparatus 101 analyzes the page drawing data and detects an error. Similar to step S6112 illustrated in FIG. 6A1, in a case where the received page drawing data includes a command that cannot be analyzed by the printing apparatus 101, the printing apparatus 101 detects the data error.

The PDF analysis unit 317 notifies the job control unit 305 of a data error notification. The retransmission permission/inhibition determination unit 308 determines whether the automatic retransmission function of the printing apparatus 101 is enabled. Referring to FIG. 6B, since the automatic retransmission function is disabled, the job control unit 305 sets the job status to "Suspended". Then, the job control unit 305 displays a screen illustrated in FIG. 9A on the operation unit 221.

Meanwhile, upon receipt of the notification in step S6111, in step S6213, the information processing apparatus 103 makes an inquiry to the printing apparatus 101 about the job processing status through periodical polling.

In step S6124, for the job having the job status "Suspended", the printing apparatus 101 determines the type of the error to be notified to the information processing apparatus 103 based on the determination by the retransmission permission/inhibition determination unit 308. In this case, since the retransmission permission/inhibition determination unit 308 determines that the retransmission is inhibited, the printing apparatus 101 determines the error information to be transmitted to the information processing apparatus 103 as a second error (document-format-error).

In step S6125, the printing apparatus 101 notifies the information processing apparatus 103 of the job status "Suspended" and of the second error (document-format-error) that does not permit the retransmission from a host side.

In step S6126, the user confirms the output result by using the operation unit 221 of the printing apparatus 101 and then cancels the suspended print job on the printing apparatus 101.

After step S6215, in step S6127, the information processing apparatus 103 periodically makes an inquiry to the printing apparatus 101 about the job processing status.

In step S6128, in response to the inquiry made after the job has been canceled by a user operation, the printing apparatus 101 notifies the information processing apparatus 103 that the job has been canceled on a device.

In step S6129, the job status monitoring unit 509-1 of the information processing apparatus 103 recognizes that the job is completed and then deletes the job from the print spooler 510-1.

Thus, if an error occurs in the analysis of the page drawing data in a case where the retransmission of print data is disabled, the printing apparatus 101 notifies the information processing apparatus 103 of the second error that does not permit the retransmission from the host side. The information processing apparatus 103 that has been notified of the second error does not retransmit the print job but waits until the job is canceled by the printing apparatus 101. This enables preventing the print job from being retransmitted unnoticed by the user.

Figure 6C:
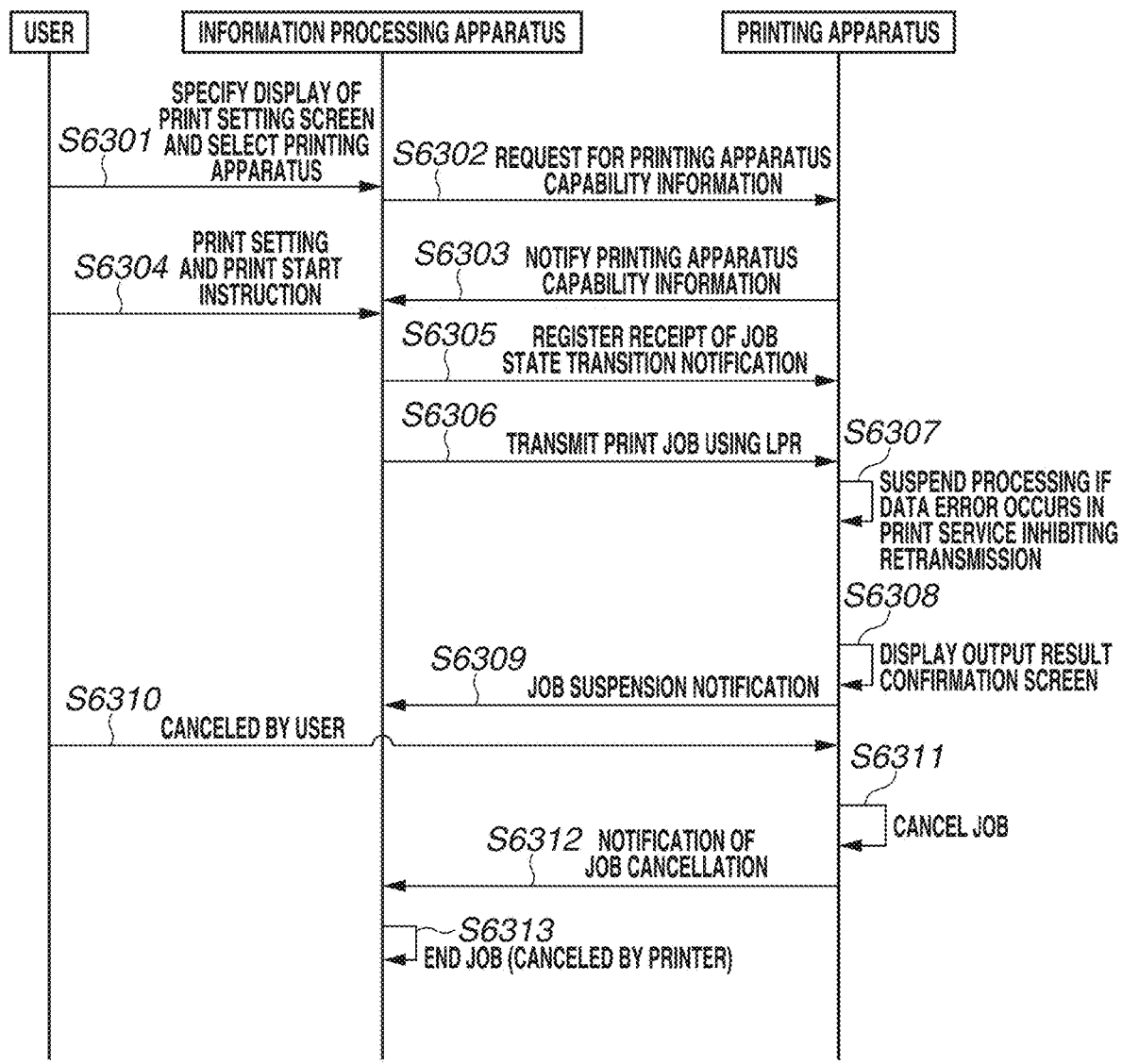
FIG. 6C is a sequence diagram illustrating processing using a protocol that does not retransmit a print job at the occurrence of a data error according to the present exemplary embodiment.

A sequence diagram illustrated in FIG. 6C will be described. FIG. 6C illustrates a sequence of printing based on the LPR protocol employed by a backbone printing system such as a PC. When the user uses the printing based on the LPR protocol, the printing apparatus 101 does not permit the automatic retransmission from the information processing apparatus 103 at the occurrence of a data error but suspends the job and notifies the user of the error.

In step S6301, the user operates the application 501-2 to specify display of a print setting screen of the printing apparatus to be used for printing and then selects the printing apparatus to be used for printing.

In step S6302, the information processing apparatus 103 transmits a request for acquiring capability information about the printing apparatus 101 selected on the print setting screen, to the printing apparatus 101.

Upon receipt of the capability information request, in step S6303, the printing apparatus 101 notifies the information processing apparatus 103 of necessary capability information to be displayed on the print setting screen. The information processing apparatus 103 instructs the touch panel 406 to display the print setting screen based on the received capability information.

In step S6304, the user makes print settings on the displayed print setting screen and issues a print start instruction.

In step S6305, the information processing apparatus 103 registers the receipt of a job state transition notification to the printing apparatus 101. Then, in step S6306, the information processing apparatus 103 transmits page drawing data (PDL data) of a print job to the printing apparatus 101 using the LPR (Line Printer Remote) protocol.

The PCL analysis unit 319 of the printing apparatus 101 analyzes the page drawing data received from the information processing apparatus 103 in step S6306. In this case, because the data is in the PCL data format, the PCL analysis unit 319 performs PCL analysis processing and detects an unanalyzable data description in a PDF file. In step S6307, the PCL analysis unit 319 notifies the job control unit 305 of a data error notification, and the job control unit 305 performs job suspend processing in cooperation with the retransmission permission/inhibition determination unit 308.

In step S6308, the printing apparatus 101 displays an output result confirmation screen on a UI screen for the user. In step S6309, the printing apparatus 101 notifies the information processing apparatus 103 that the job status is "Suspended".

In step S6310, the user refers to the suspended job on the printing apparatus 101, confirms a cause of the error, and cancels the job. Upon receipt of an instruction from the UI control unit 301 of the printing apparatus 101, in step S6311, the job control unit 305 cancels the job. In step S6312, the printing apparatus 101 notifies the information processing apparatus 103 of completion of the job (cancellation by the user). Upon receipt of the job completion notification, in step S6313, the job status monitoring unit 509-1 of the information processing apparatus 103 deletes the job from the print spooler 510-1.

Figure 7A:
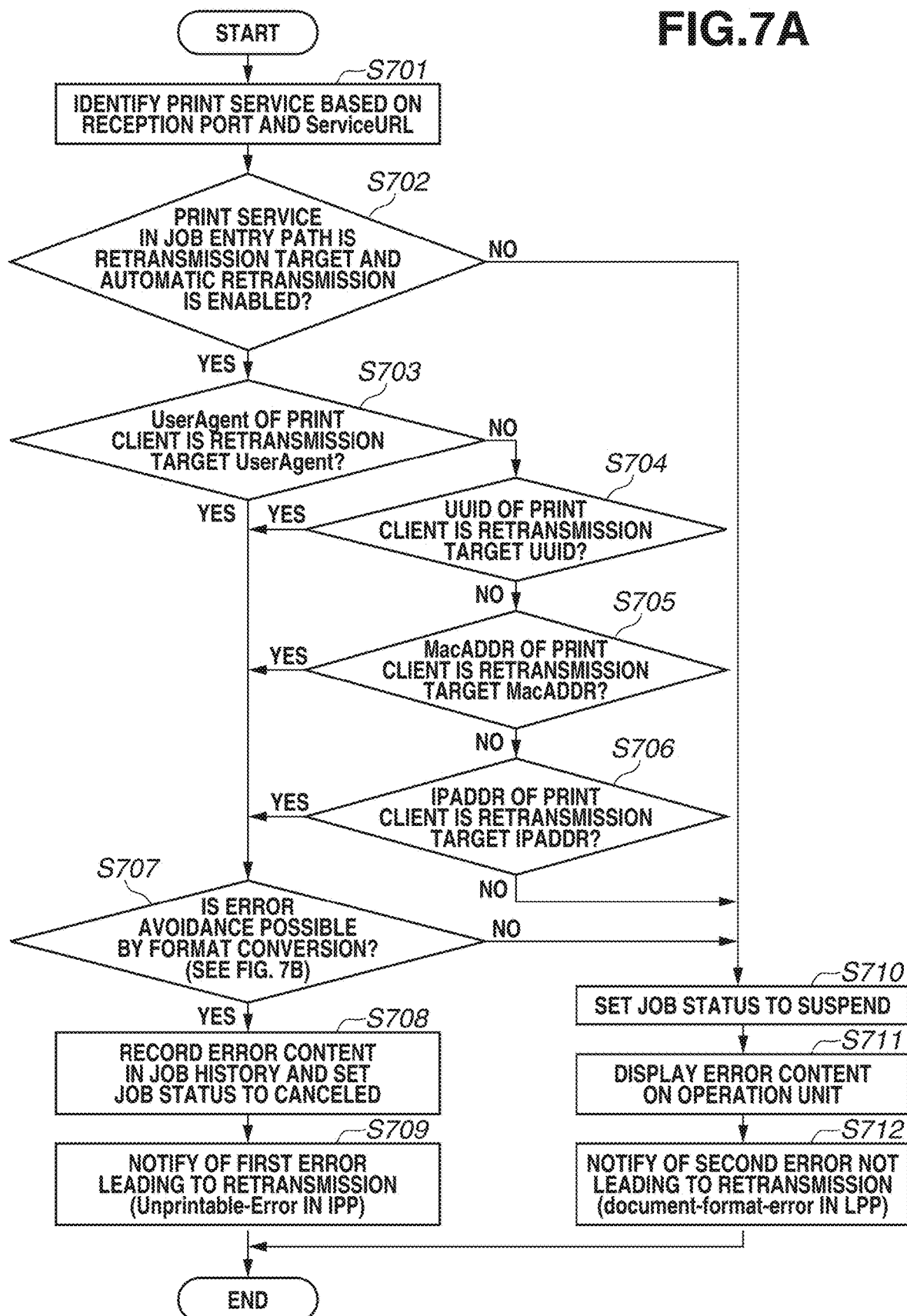
FIG. 7A is a flowchart illustrating processing performed when the printing apparatus receives a print job according to the present exemplary embodiment.

FIG. 7A is a flowchart illustrating processing performed by the retransmission permission/inhibition determination unit 308 of the printing apparatus 101. The flowchart illustrated in FIG. 7A is started when the printing apparatus 101 receives the page drawing data in step S6110 illustrated in FIGS. 6A1 and 6B or receives the page drawing data in step S6306 illustrated in FIG. 6C.

In step S701, the retransmission permission/inhibition determination unit 308 of the printing apparatus 101 identifies the print service that has transmitted the page drawing data. The retransmission permission/inhibition determination unit 308 compares the information in Table 1110 illustrated in FIG. 11 with the port number of a port that has received a print job from the information processing apparatus 103 and a transmission source URL of the printing job to identify the print service used in print job transmission.

In step S702, the retransmission permission/inhibition determination unit 308 determines whether the print service identified in step S701 is a print service in which the automatic retransmission function is enabled. The retransmission permission/inhibition determination unit 308 refers to the Retransmission SW 1115 in Table 1110 to determine whether the automatic retransmission function is enabled or disabled. If the automatic retransmission function is enabled (YES in step S702), the processing proceeds to step S703. If the automatic retransmission function is disabled (NO in step S702), the processing proceeds to step S710.

In step S703, the retransmission permission/inhibition determination unit 308 determines whether the UserAgent of the print client acquired by the IPP service control unit 315 is a retransmission target client. The retransmission permission/inhibition determination unit 308 compares the UserAgent notified by the information processing apparatus 103 with the "UserAgent" 1122 stored in Table 1120 illustrated in FIG. 11 in association with the print service identified in step S701. If the UserAgent notified by the information processing apparatus 103 is stored in Table 1120 illustrated in FIG. 11 in association with the print service identified in step S701 (NO in step S703), the processing proceeds to step S704. If the UserAgent notified by the information processing apparatus 103 is not stored in Table 1120 in association with the print service identified in step S701 (YES in step S703), the processing proceeds to step S707.

In step S704, the retransmission permission/inhibition determination unit 308 determines whether the UUID of the print client acquired by the IPP service control unit 315 is a UUID of the retransmission target client. The retransmission permission/inhibition determination unit 308 compares the UUID notified by the information processing apparatus 103 with the "UUID" 1123 stored in Table 1120 in association with the print service identified in step S701. If a UUID identical to the UUID notified by the information processing apparatus 103 is stored in Table 1120 in association with the print service identified in step S701 (NO in step S704), the processing proceeds to step S705. Also, if the UUID stored in association with the print service identified in step S701 is asterisk (*) (NO in step S704), the processing proceeds to step S705. If the UUID notified by the information processing apparatus 103 is not stored in Table 1120 in association with the print service identified in step S701 (YES in step S704), the processing proceeds to step S707.

In step S705, the retransmission permission/inhibition determination unit 308 determines whether the MAC address of the print client acquired by the IPP service control unit 315 is the MAC address of the retransmission target client. The retransmission permission/inhibition determination unit 308 compares the MAC address notified by the information processing apparatus 103 with the MacADDR 1124 stored in Table 1120 in association with the print service identified in step S701. If a MacADDR identical to the MAC address notified by the information processing apparatus 103 is stored in Table 1120 in association with the print service identified in step S701 (NO in step S705), the processing proceeds to step S706. Also, if the MacADDR stored in association with the print service identified in step S701 is "*" (NO in step S705), the processing proceeds to step S706. If the MAC address notified by the information processing apparatus 103 is not stored in Table 1120 in association with the print service identified in step S701 (YES in step S705), the processing proceeds to step S707.

In step S706, the retransmission permission/inhibition determination unit 308 determines whether the IP address of the print client acquired by the IPP service control unit 315 is the IP address of the retransmission target client. The retransmission permission/inhibition determination unit 308 compares the IP address notified by the information processing apparatus 103 with the "IPADDR" 1125 stored in Table 1120 in association with the print service identified in step S701. If an IPADDR identical to the IP address notified by the information processing apparatus 103 is stored in Table 1120 in association with the print service identified in step S701 (NO in step S706), the processing proceeds to step S710. Also, if the IPADDR stored in association with the print service identified in step S701 is "*" (NO in step S706), the processing proceeds to step S710. If the IPADDR notified by the information processing apparatus 103 is not stored in Table 1120 in association with the print service identified in step S701 (YES in step S706), the processing proceeds to step S707.

In step S707, if format conversion is performed before retransmission, the retransmission permission/inhibition determination unit 308 determines whether data error avoidance is possible. The processing in step S707 will be described below with reference to FIG. 7B.

In step S708, the job control unit 305 records the content of the error in the job history and then sets the job status to "Canceled".

In step S709, the IPP service control unit 315 transmits the first error notification (unprintable-error) leading to retransmission and completes the processing.

In step S710, the job control unit 305 determines the job as an error and then sets the job status to "Suspended".

Figure 9A:
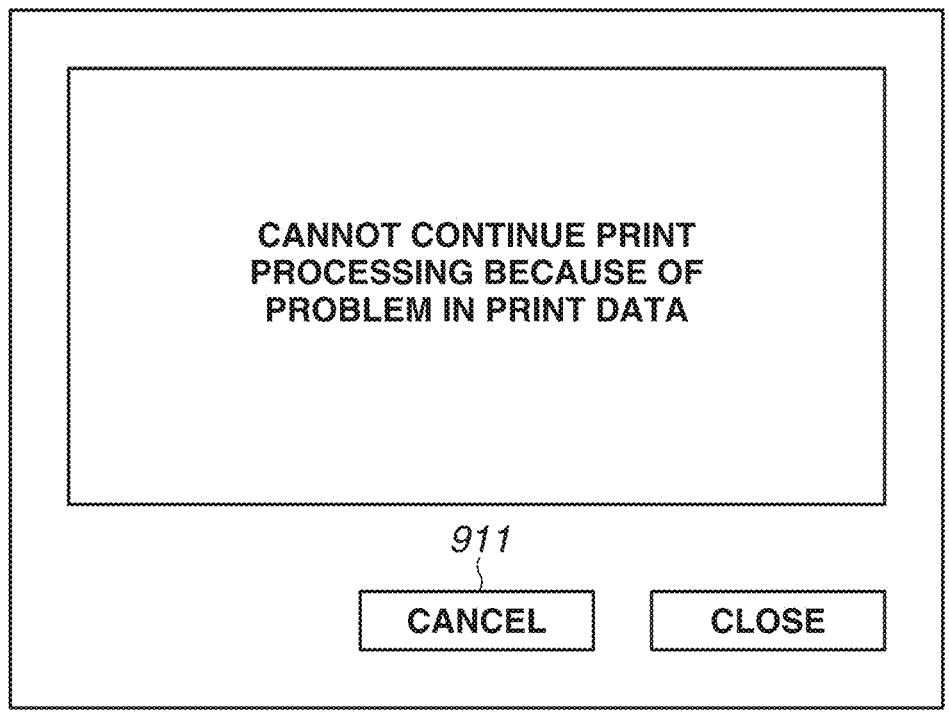
FIGS. 9A, 9B, 9C, and 9D are diagrams each illustrating an example of user interface (UI) screens displayed on an operation unit of the printing apparatus according to the present exemplary embodiment.

In step S711, the UI control unit 301 displays the error screen illustrated in FIG. 9A on the operation unit 221 of the printing apparatus 101.

In step S712, the IPP service control unit 315 transmits the second error (document-format-error) not leading to the retransmission on the client side and completes the processing.

Referring to FIG. 7A, the retransmission permission/inhibition determination unit 308 determines whether the print service used in the print job transmission is a predetermined print service and determines whether to perform the retransmission based on the UserAgent, UUID, MAC address, and IP address of the information processing apparatus 103. Alternatively, the processing in steps S703 to S706 may be omitted. More specifically, if the print service used in the print job retransmission is a predetermined print service (YES in step S702), the processing may proceed to step S707. If the print service used in the print job retransmission is not a predetermined print service (NO in step S702), the processing proceeds to step S710. Alternatively, one or a plurality of steps S703 to S706 may be executed. If the result in step S702 is "YES", the processing proceeds to step to be executed among steps S703 to S706.

Figure 7B:
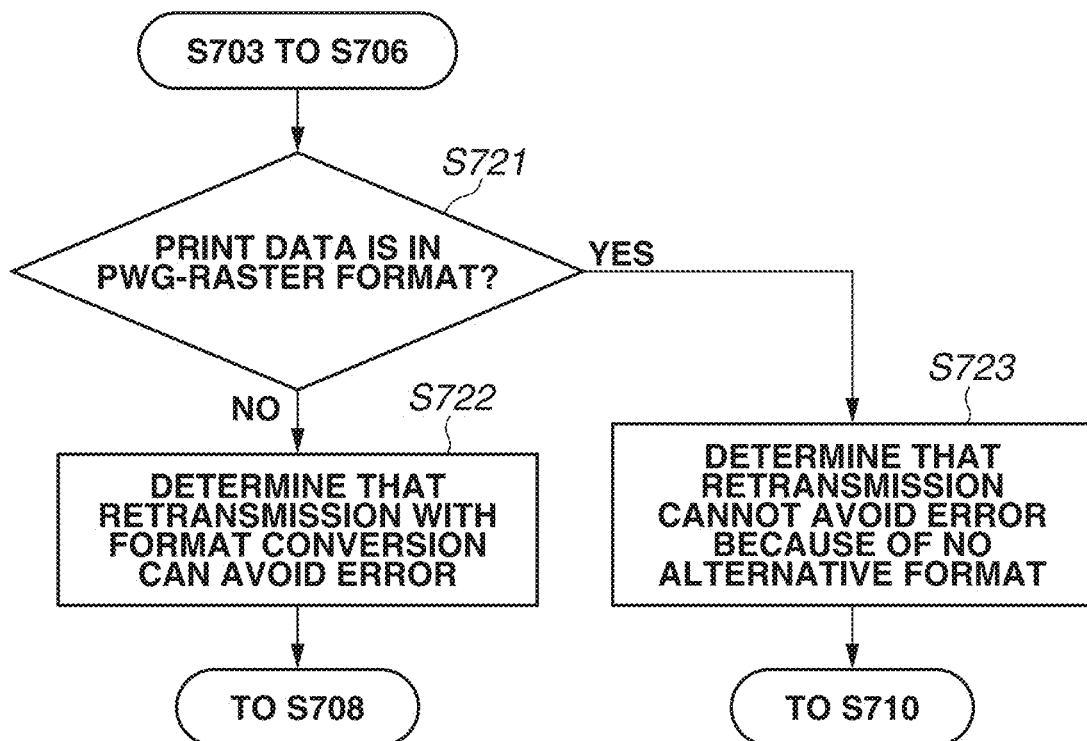
FIG. 7B is a flowchart illustrating processing for determining whether the printing apparatus retransmits a print job using a changed format according to the present exemplary embodiment.

FIG. 7B is a flowchart illustrating details of step S707 illustrated in FIG. 7A. Each process is implemented by the CPU 211 executing a program.

In step S721, the retransmission permission/inhibition determination unit 308 determines whether the format of the page drawing data included in the job with the occurrence of a data error is the PWG-raster format. If the format of the page drawing data is the PWG-raster format (YES in step S721), the processing proceeds to step S723. If the format of the page drawing data is not the PWG-raster format (NO in step S721), the processing proceeds to step S722.

In step S722, if the information processing apparatus 103 converts the transmission format into the PWG-raster format and then performs retransmission, the printing apparatus 101 may be possible to process the page drawing data. Thus, the printing apparatus 101 determines that the automatic retransmission processing with data conversion can be an error avoidance measure. In this case, the processing proceeds to step S708.

In step S723, since there is no interpreter supporting an alternative format that can be processed by the printing apparatus 101, the printing apparatus 101 determines that the automatic retransmission processing with data conversion will not be an error avoidance measure. In this case, the processing proceeds to step S710.

Referring to FIG. 7B, upon completion of step S721, the processing proceeds to step S708 or S710 via step S722 or S723, respectively. Alternatively, the processing may skip steps S722 and S723. In this case, if the result in step S721 is YES, the processing may proceed to step S710. If the result in step S721 is NO, the processing may proceed to step S708.

FIG. 8 is a flowchart illustrating processing performed by the information processing apparatus 103 to transmit print data to the printing apparatus 101. The processing in this flowchart is implemented by the CPU 401 executing a program. The flowchart is started by the user performing a print start operation on the information processing apparatus 103. In the following processing, a branch number of each software block is omitted. This flowchart uses software blocks supporting the protocol that is applicable to the print service to be used.

In step S801, the page generation unit 507 generates print data. Then, the processing proceeds to step S802. In step S801, if the job status monitoring unit 509 issues an instruction for the format of the page drawing data, the PDL generation unit 508 generates page drawing data in the specified format. If the job status monitoring unit 509 does not issue the instruction for the format of the page drawing data, the print job generation unit 505 determines the format of the page drawing data based on a capability notification from the printing apparatus 101 and a retransmission request notification from the job status monitoring unit 509.

In step S802, the job attribute generation unit 506 generates a job ticket. The job ticket includes a setting value of the print job and information indicating the format of the page drawing data.

In step S803, the IPP client control unit 503 transmits the print job to the printing apparatus 101. If LPD is set as a print protocol, in step S803, the LPD client control unit 518 transmits the print job to the printing apparatus 101.

In step S804, the job status monitoring unit 509 acquires the status of the print job transmitted from the printing apparatus 101.

In step S805, the job status monitoring unit 509 determines whether the job status acquired from the printing apparatus 101 is "Completed". If the job status is "Completed" (YES in step S805), the job status monitoring unit 509 ends the processing of this flowchart. If the acquired job status is other than "Completed" (NO in step S805), the processing proceeds to step S806.

In step S806, the job status monitoring unit 509 determines whether the error notified by the printing apparatus 101 is an error that permits the print job retransmission. If the error notified by the printing apparatus 101 is the first error (YES in step S806), the processing proceeds to step S807. If the error notified by the printing apparatus 101 is the second error (NO in step S806), the processing proceeds to step S808.

In step S807, the job status monitoring unit 509 determines a format for retransmission different from the format at the time of the first transmission. Then, the processing returns to step S801. In step S807, the job status monitoring unit 509 selects the PWG-raster format.

In step S808, the print screen control unit 512 displays a job confirmation request on the touch panel 406 of the information processing apparatus 103. Then, the processing returns to step S804. The user who has seen the screen displayed on the touch panel 406 of the information processing apparatus 103 moves to the printing apparatus 101 as required and then cancels the job on the printing apparatus 101.

Referring to FIG. 8, in a case where the retransmission format is determined in step S807 and the processing returns to step S801, the page generation unit 507 generates print data again from a start page.

FIGS. 9A, 9B, 9C, and 9D illustrate examples of screens displayed on the operation unit 221 if the printing apparatus 101 fails in the analysis of the page drawing data included in the print job received by the printing apparatus 101.

FIG. 9A illustrates a screen displayed on the operation unit 221 when the automatic retransmission function is disabled. The screen illustrated in FIG. 9A is displayed in step S6212 illustrated in FIG. 6B, step S6308 illustrated in FIG. 6C, and step S710 illustrated in FIG. 7A. The screen illustrated in FIG. 9A notifies the user that printing cannot be continued because of a problem in the received print data. The job status Suspended continues until the user presses a "Cancel" button 911. When the user presses the "Cancel" button 911, the job status changes from Suspended to Canceled.

Figure 9B:
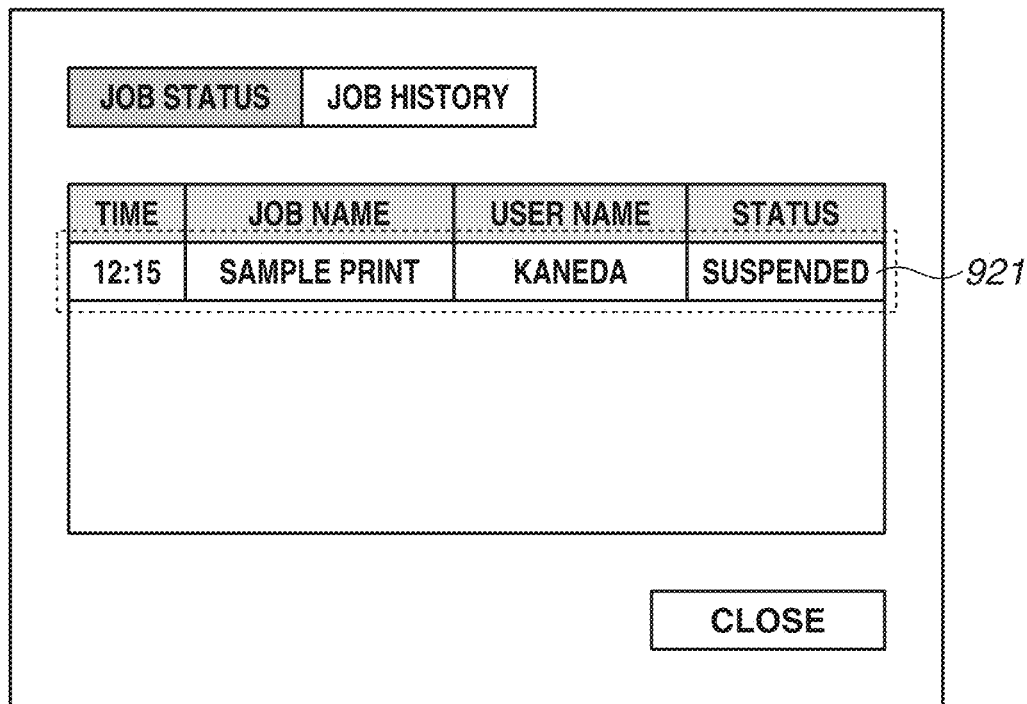

FIG. 9B illustrates an example of a job status screen displayed on the operation unit 221 when the automatic retransmission function is disabled. The screen illustrated in FIG. 9B is displayed, for example, when the user presses a "Close" button on the screen illustrated in FIG. 9A and then performs an operation for displaying the job status screen. The job is displayed as "Suspended" 921 on the job status screen.

Figure 9C:
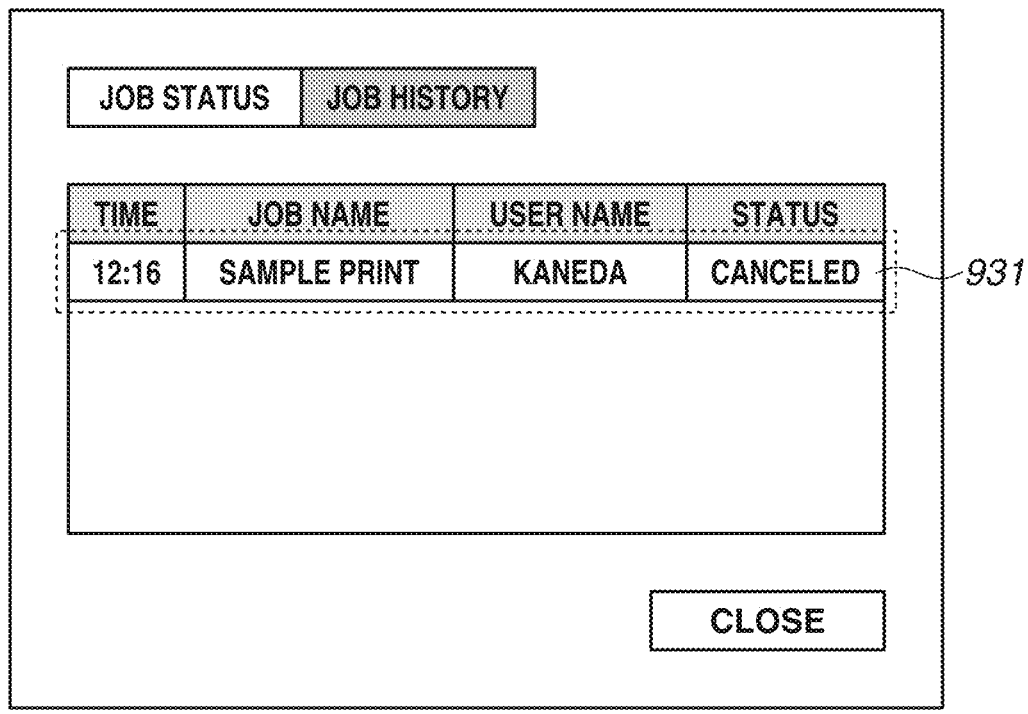

FIG. 9C is an example of the job status screen displayed on the operation unit 221 when the automatic retransmission function is enabled. In the case of a print service and a print client that permit the information processing apparatus 103 to perform the automatic retransmission, the job is automatically canceled and displayed as "Canceled" 931 in the job history.

Figure 9D:
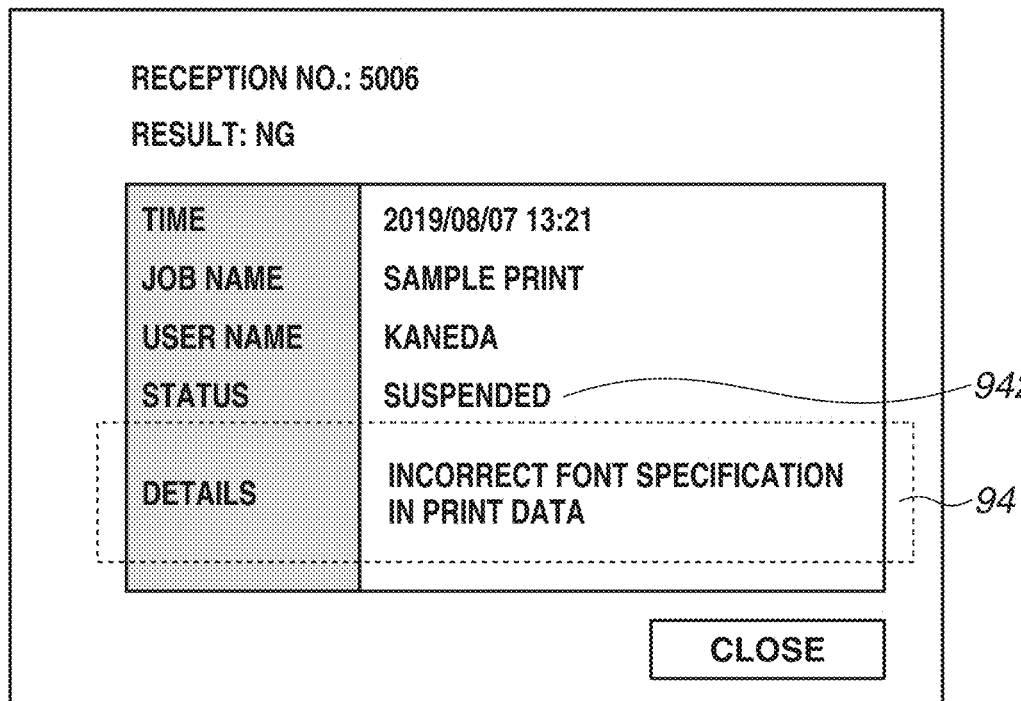

FIG. 9D is a job detail screen of the printing apparatus 101. The screen is displayed when the user presses the "Suspended" 921 illustrated in FIG. 9B or the "Canceled" 931 illustrated in FIG. 9C. The job detail screen displays a result of the job and a reason why the job was suspended or canceled. "Status" 942 is indicated as "Suspended" or "Canceled" depending on the job status. If the user selects the "Suspended" 921 on the screen illustrated in FIG. 9B, "Status" illustrated in FIG. 9D is indicated as "Suspended". On the other hand, if the user selects "Canceled" 931 on the screen illustrated in FIG. 9C, "Status" 942 illustrated in FIG. 9D" is indicated as "Canceled". "Detail" 941 illustrated in FIG. 9D indicates that the job was suspended or canceled because of an analysis error in the page drawing data. Displaying details as illustrated in FIG. 9D enables the user to know the reason why the job was suspended or canceled.

As described above, the present exemplary embodiment makes it possible to permit or inhibit the retransmission at the occurrence of a data error depending on the information processing apparatus 103 as the print job transmission source.

According to the above-described exemplary embodiment, the processing illustrated in FIG. 7A is executed after step S6111 illustrated in FIGS. 6A1 and 6B. Steps S701 to S707 illustrated in FIG. 7A may be executed after step S6107 illustrated in FIGS. 6A1 and 6B. In this case, as a result of step S707, the retransmission permission/inhibition determination unit 308 stores, in the RAM 213, information indicating whether the automatic retransmission is enabled. Then, in steps S6114 and S6214, the printing apparatus 101 may refer to the above-described information stored in the RAM 213 and then execute the processing in step S708 and subsequent steps illustrated in FIG. 7A.

The present disclosure is implemented also by performing the following processing. More specifically, software (program) for implementing the functions of the above-described exemplary embodiments is supplied to a system or apparatus via a network or various types of storage media, and a computer (or CPU or micro processing unit (MPU)) of the system or apparatus reads and executes the program. In this case, the computer program and a storage medium storing the program are included in the present disclosure.

Embodiments of the present disclosure makes it possible to provide a printing apparatus that controls the determination whether to retransmit a print job at the occurrence of an error depending on a print job transmission source. Other Embodiments Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A printing apparatus comprising:
a controller configured to:
receive image data from an information processing apparatus;
execute a process based on the received image data;
transmit first information to the information processing apparatus, in a case where the received image data has been generated by a first print service and a format of the received image data is a first format, wherein the first information is information for cancelling a print job based on the received image data;
transmit second information to the information processing apparatus, in a case where the received image data has been generated by a second print service different from the first print service and the format of the received image data is the first format, wherein the second information is information for pausing the print job based on the received image data; and
transmit the second information to the information processing apparatus, in a case where the format of the received image data is a second format.

2. The printing apparatus according to claim 1, wherein the first format is PDF and the second format is raster.

3. The printing apparatus according to claim 2, wherein the controller receives raster image data into which the image data is converted by the information processing apparatus that received the first information.

4. The printing apparatus according to claim 3, wherein the information processing apparatus that received the second information does not transmit the raster image data.

5. The printing apparatus according to claim 1, wherein an error occurs in a case that the received image data includes a command that the printing apparatus is not able to interpret.

6. A control method for controlling a printing apparatus, the control method comprising:
- receiving image data from an information processing apparatus;
- executing a process based on the received image data;
- transmitting first information to the information processing apparatus, in a case where the received image data has been generated by a first print service and a format of the received image data is a first format, wherein the first information is information for cancelling a print job based on the received image data;
- transmitting second information to the information processing apparatus, in a case where the received image data has been generated by a second print service different from the first print service and the format of the received image data is the first format, wherein the second information is information for pausing the print job based on the received image data; and
- transmitting the second information to the information processing apparatus, in a case where the format of the received image data is a second format.

7. The control method according to claim 6, wherein the first format is PDF and the second format is raster.

8. The control method according to claim 7, further comprising:
- receiving raster image data into which the image data is converted by the information processing apparatus that received the first information.

9. The control method according to claim 8, wherein the information processing apparatus that received the second information does not transmit the raster image data.

10. The control method according to claim 6, wherein an error occurs in a case that the received image data includes a command that the printing apparatus is not able to interpret.

11. A non-transitory computer-readable storage medium storing computer-executable instructions that, when executed by a computer, cause the computer to perform a control method for a printing apparatus, the control method comprising:
- receiving image data from an information processing apparatus;
- executing a process based on the received image data;
- transmitting first information to the information processing apparatus, in a case where the received image data has been generated by a first print service and a format of the received image data is a first format, wherein the first information is information for cancelling a print job based on the received image data;
- transmitting second information to the information processing apparatus, in a case where the received image data has been generated by a second print service different from the first print service and the format of the received image data is the first format, wherein the second information is information for pausing the print job based on the received image data; and
- transmitting the second information to the information processing apparatus, in a case where the format of the received image data is a second format.

12. The printing apparatus according to claim 1, wherein the first print service and the second print service comply with a predetermined protocol.

13. The printing apparatus according to claim 12, wherein the predetermined protocol is an Internet Printing Protocol.

* * * * *